(12) United States Patent
Kim et al.

(10) Patent No.: US 11,651,750 B2
(45) Date of Patent: May 16, 2023

(54) FOLDABLE ELECTRONIC DEVICE AND MULTI-WINDOW OPERATION METHOD USING SAME

(71) Applicant: Samsung Electronics Co., Ltd., Suwon-si (KR)

(72) Inventors: Sangheon Kim, Suwon-si (KR); Jongwu Baek, Suwon-si (KR); Seungnyun Kim, Suwon-si (KR); Woocheol Jung, Suwon-si (KR); Younghak Oh, Suwon-si (KR); Munhwi Kim, Suwon-si (KR); Junwon Jung, Suwon-si (KR); Kyuok Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/703,915

(22) Filed: Mar. 24, 2022

(65) Prior Publication Data

US 2022/0215815 A1    Jul. 7, 2022

Related U.S. Application Data

(63) Continuation of application No. PCT/KR2020/013002, filed on Sep. 24, 2020.

(30) Foreign Application Priority Data

Sep. 24, 2019  (KR) .................. 10-2019-0117240

(51) Int. Cl.
*G09G 5/14*    (2006.01)
*H04M 1/02*    (2006.01)

(52) U.S. Cl.
CPC ....... *G09G 5/14* (2013.01); *G09G 2340/0407* (2013.01); *G09G 2354/00* (2013.01); *G09G 2360/04* (2013.01); *H04M 1/0216* (2013.01)

(58) Field of Classification Search
None
See application file for complete search history.

(56) References Cited

U.S. PATENT DOCUMENTS 8,947,462 B2   2/2015 Joo
9,013,368 B1   4/2015 Kim
(Continued)

FOREIGN PATENT DOCUMENTS

KR   10-2013-0024085 A   3/2013
KR   10-2013-0056674 A   5/2013
(Continued)

OTHER PUBLICATIONS

International Search Report and Written Opinion of the International Searching Authority dated Jan. 15, 2021, in connection with International Application No. PCT/KR2020/013002, 11 pages.

*Primary Examiner* — Patrick F Valdez

(57) ABSTRACT

Disclosed is a foldable electronic device comprising: a foldable housing which includes a first housing and a second housing; a first display which is disposed at a first surface of the foldable housing, can be folded according to folding operations of the first housing and the second housing, and includes an exposure region exposed to the outside in a folded state; a second display which is disposed in at least a portion of a second surface of the first housing, positioned opposite to the first surface; a sensor which senses a folding angle of the foldable housing; and a processor which is operatively connected to the first display, the second display, and the sensor.

20 Claims, 27 Drawing Sheets

(56) References Cited

U.S. PATENT DOCUMENTS

| | | | |
|---|---|---|---|
| 9,348,504 | B2 | 5/2016 | Kwak et al. |
| 9,406,281 | B2 | 8/2016 | Lee |
| 9,818,370 | B2 | 11/2017 | Joo |
| 11,163,336 | B2 | 11/2021 | Jung et al. |
| 2013/0127918 | A1 | 5/2013 | Kang et al. |
| 2013/0321340 | A1* | 12/2013 | Seo .................... G06F 3/04845 |
| | | | 345/174 |
| 2015/0097755 | A1* | 4/2015 | Kim ...................... G06F 3/1446 |
| | | | 345/1.3 |
| 2015/0378557 | A1 | 12/2015 | Jeong et al. |
| 2018/0039387 | A1* | 2/2018 | Cheong ................ G06F 1/1677 |
| 2020/0341823 | A1* | 10/2020 | Liu ...................... H04M 1/0241 |
| 2021/0048854 | A1 | 2/2021 | Kang et al. |

FOREIGN PATENT DOCUMENTS

| | | | |
|---|---|---|---|
| KR | 10-2014-0046346 A | 4/2014 |
| KR | 10-2014-0085048 A | 7/2014 |
| KR | 10-2015-0040553 A | 4/2015 |
| KR | 10-1559375 B1 | 10/2015 |
| KR | 10-2017-0086321 A | 7/2017 |
| KR | 10-2017-0102451 A | 9/2017 |

* cited by examiner

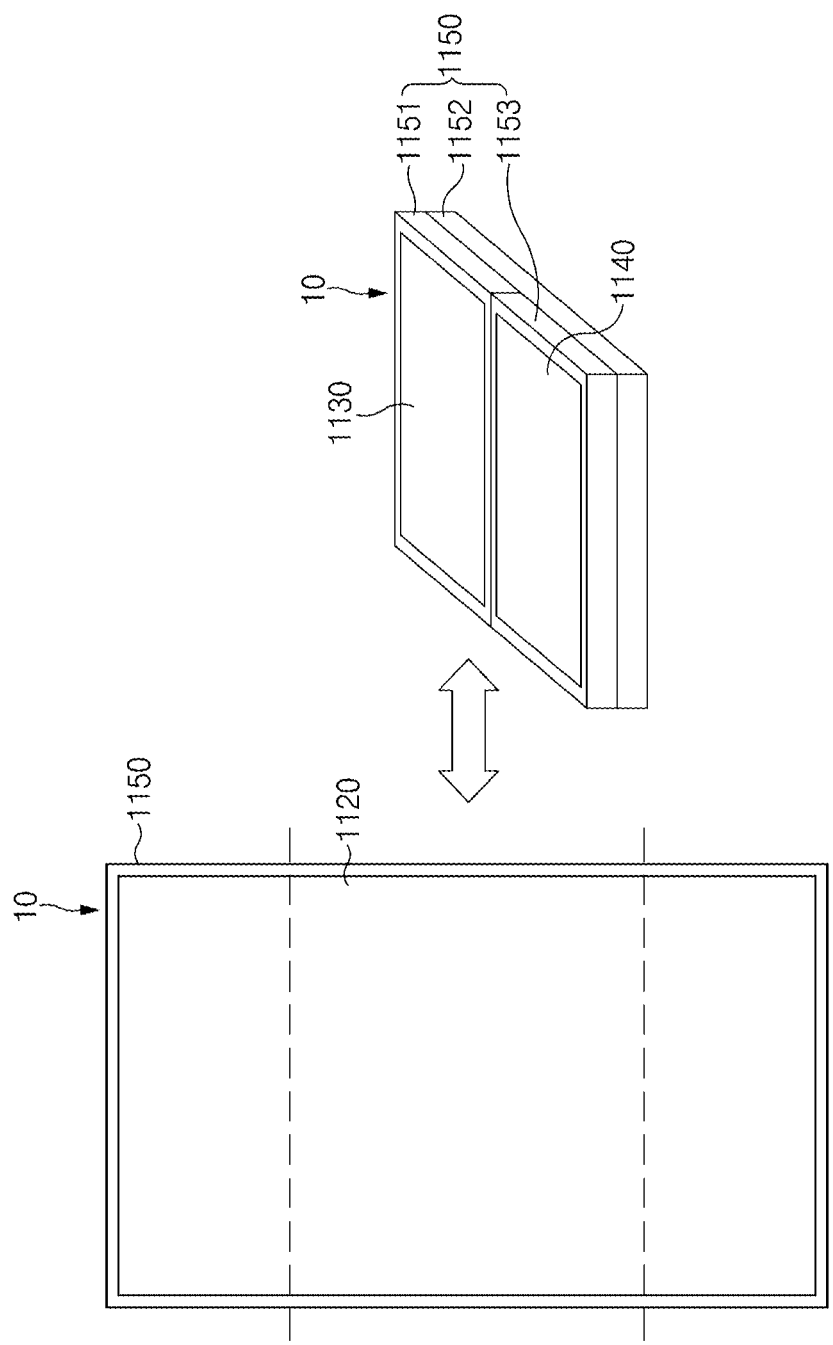

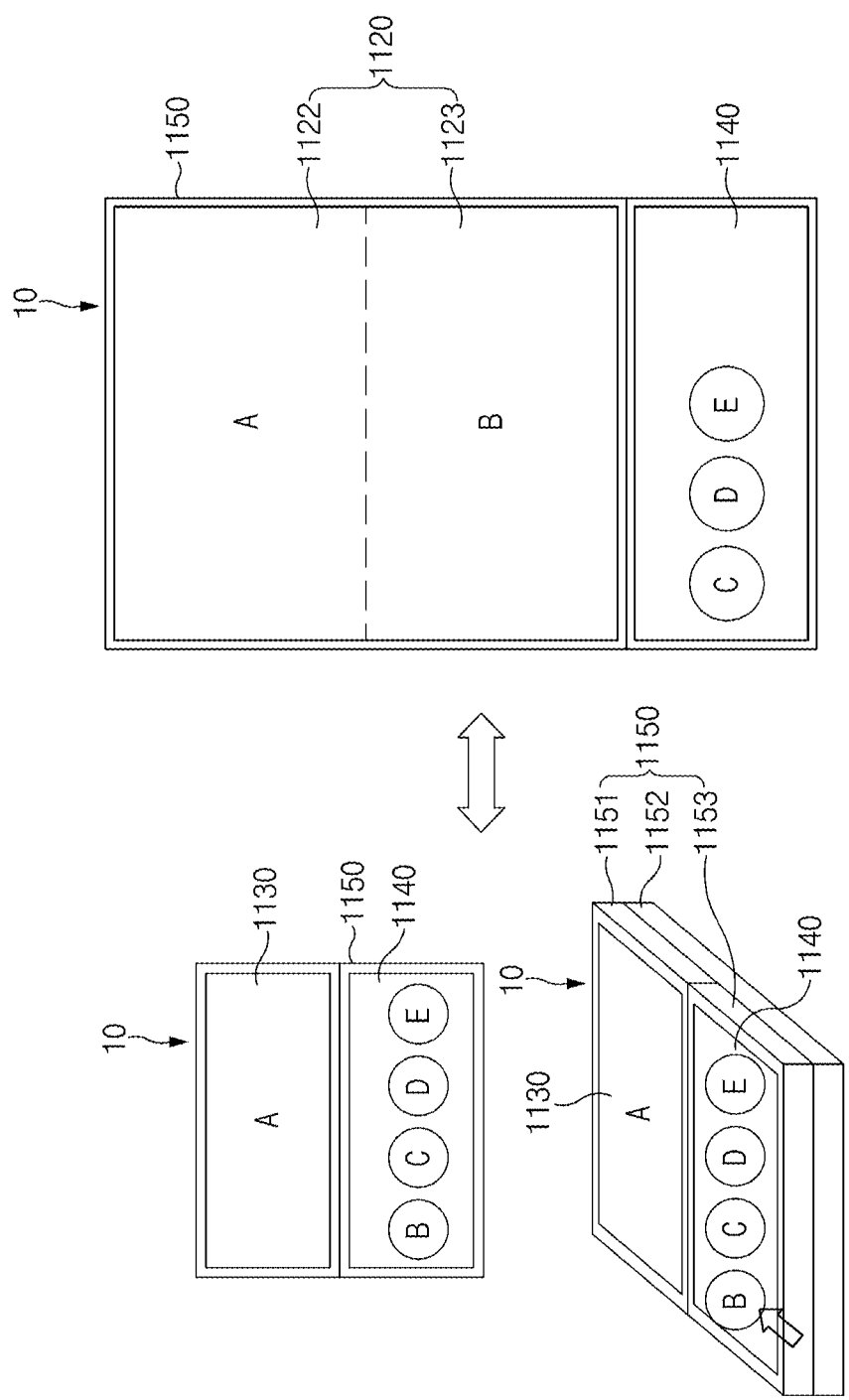

FOLDABLE ELECTRONIC DEVICE AND MULTI-WINDOW OPERATION METHOD USING SAME

CROSS-REFERENCE TO RELATED APPLICATIONS

This application is a Bypass Continuation of International Application No. PCT/KR2020/013002, filed Sep. 24, 2020, which claims priority to Korean Patent Application No. 10-2019-0117240, filed Sep. 24, 2019, the disclosures of which are herein incorporated by reference in their entirety.

BACKGROUND

1. Field

Various embodiments of the disclosure described herein relate to a foldable electronic device and a method for operating a multi-window using the same.

2. Description of Related Art

An electronic device including a foldable display (hereinafter, referred to as the "foldable electronic device") that provides a large screen to a user and is easy to carry is being developed.

The foldable electronic device includes displays on the front and rear surfaces thereof and may display application information by switching the two displays depending on an unfolded or folded state.

SUMMARY

The foldable electronic device in the related art has to be equipped with an auxiliary display for outputting application information when the foldable electronic device is changed from an unfolded state to a folded state.

Furthermore, in the case where the foldable electronic device operates in a multi-window mode in the unfolded state, the auxiliary display of the foldable electronic device may not support the multi-window mode when the foldable electronic device is changed to the folded state. Thereafter, when the foldable electronic device is changed back to the unfolded state, a multi-window running in the previous unfolded state may not be output, which may lead to an inconvenience to the user.

A foldable electronic device according to an embodiment of the disclosure includes a foldable housing including a first housing and a second housing connected with at least a portion of the first housing so as to be foldable, a first display that is disposed on a first surface of the foldable housing and is foldable depending on a folding motion of the first housing and the second housing and that includes an exposed area exposed to the outside in a folded state, a second display disposed on at least a portion of a second surface of the first housing that faces away from the first surface, a sensor that senses a folding angle of the foldable housing, and a processor operationally connected with the first display, the second display, and the sensor. In an unfolded state of the foldable housing, the processor outputs a multi-window including a first window displaying an execution screen of a first application and a second window displaying an execution screen of a second application on the first display, and in response to a change of the foldable housing from the unfolded state to the folded state, the processor outputs the execution screen of the first application on the second display and outputs a visual object associated with the second application on the exposed area of the first display.

A foldable electronic device according to an embodiment of the disclosure includes a foldable housing including a first housing and a second housing connected with at least a portion of the first housing so as to be foldable, a first display that is disposed on a first surface of the foldable housing and is foldable depending on a folding motion of the first housing and the second housing and that includes an exposed area exposed to the outside in a folded state, a second display disposed on at least a portion of a second surface of the first housing that faces away from the first surface, a sensor that senses a folding angle of the foldable housing, and a processor operationally connected with the first display, the second display, and the sensor. In the folded state of the foldable housing, the processor outputs an execution screen of a first application on the second display and outputs a visual object associated with a second application on the exposed area, and in response to a change of the foldable housing from the folded state to an unfolded state, the processor outputs a multi-window including a first window including the execution screen of the first application and a second window including an execution screen of the second application on the first display.

A foldable electronic device according to an embodiment of the disclosure includes a foldable housing including a first housing, a second housing connected with at least a portion of the first housing so as to be foldable, and a third housing located on an opposite side to the first housing with respect to the second housing and at least partially connected with the second housing so as to be foldable, a first display disposed on a first surface of the foldable housing and foldable depending on a folding motion of the first housing, the second housing, and the third housing, a second display disposed on at least a portion of the first housing included in a second surface that faces away from the first surface, a third display disposed on at least a portion of the third housing included in the second surface, a sensor that senses a folding angle of the foldable housing, and a processor operationally connected with the first display, the second display, the third display, and the sensor. The processor outputs, on the first display, a multi-window including a first window including an execution screen of a first application and a second window including an execution screen of a second application when the foldable housing is in an unfolded state, outputs the execution screen of the first application on the second display in response to a change of the foldable housing from the unfolded state to a folded state, and outputs a visual object associated with the second application on the third display.

According to the various embodiments of the disclosure, when changed to a folded state while operating in a multi-window mode in an unfolded state, the foldable electronic device may appropriately locate execution screens of applications constituting a multi-window, thereby maintaining the continuity of the screens.

Furthermore, according to the various embodiments of the disclosure, when changed from a folded state to an unfolded state, the foldable electronic device may output execution screens of a plurality of applications in a multi-window mode, thereby enabling a user to reuse the multi-window mode without separate additional operation.

In addition, the disclosure may provide various effects that are directly or indirectly recognized.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 4F is a view illustrating a folded state of a foldable electronic device according to various embodiments of the present disclosure.

FIG. 15F is a view illustrating a form in which an application is displayed depending on a state of a foldable electronic device according to various embodiments of the present disclosure.

With regard to description of the drawings, identical or similar reference numerals may be used to refer to identical or similar components.

DETAILED DESCRIPTION

FIGS. 1 through 17, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, various embodiments of the disclosure may be described with reference to accompanying drawings. Accordingly, those of ordinary skill in the art will recognize that modification, equivalent, and/or alternative on the various embodiments described herein can be variously made without departing from the scope and spirit of the disclosure.

Figure 1:
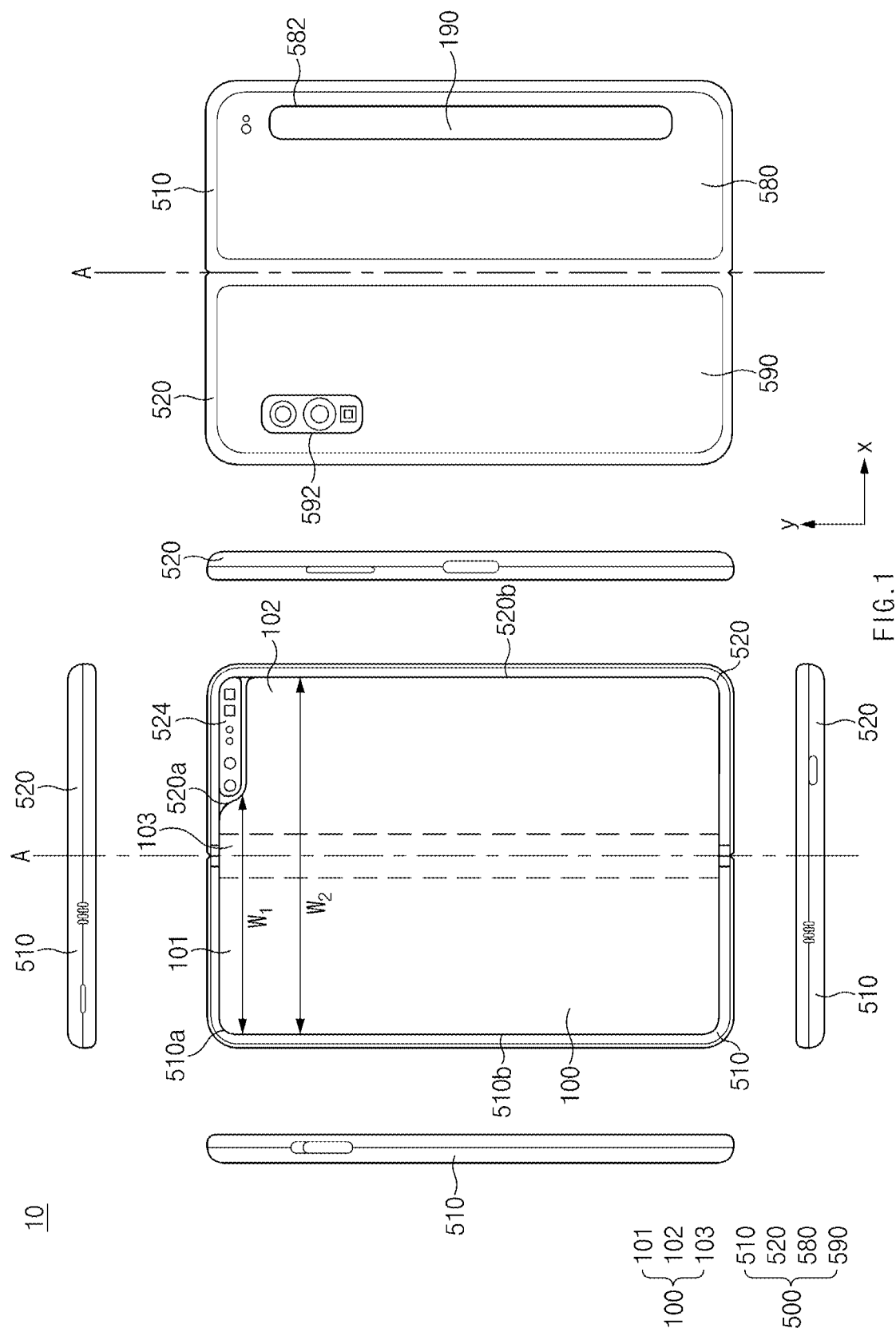
FIG. 1 is a view illustrating an unfolded state of an electronic device according to various embodiments of the present disclosure.
Figure 2:
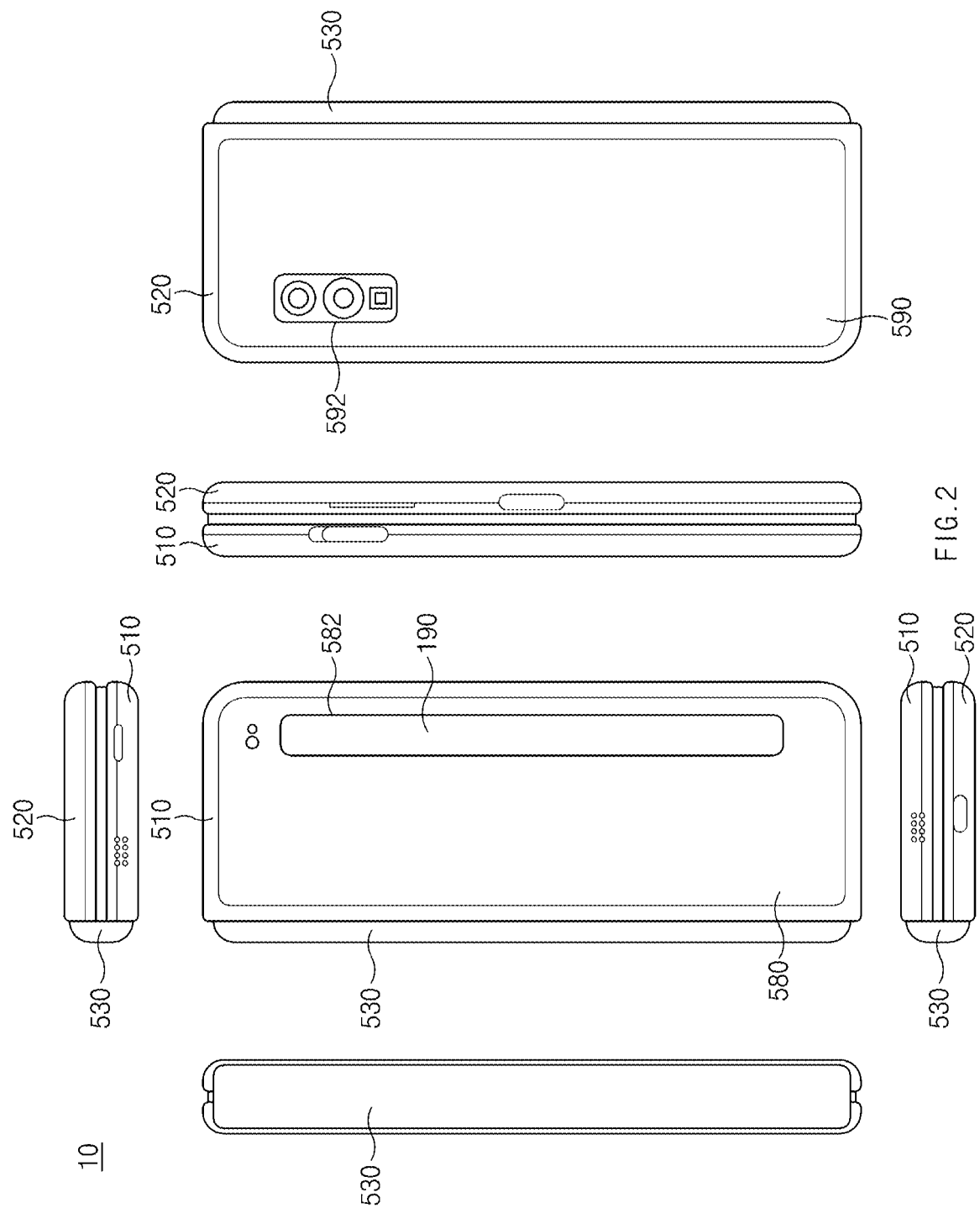
FIG. 2 is a view illustrating a folded state of the electronic device according to various embodiments of the present disclosure.

FIG. 1 is a view illustrating an unfolded state of an electronic device 10 according to various embodiments of the present disclosure, and FIG. 2 is a view illustrating a folded state of the electronic device 10 according to various embodiments of the present disclosure.

Referring to FIGS. 1 and 2, in certain embodiments, the electronic device (or, the foldable electronic device) 10 may include a foldable housing 500, a hinge cover 530 that covers a foldable portion of the foldable housing, and a flexible (or, foldable) display 100 (hereinafter, abbreviated to the "display" 100) disposed in a space formed by the foldable housing 500. In certain embodiments, a surface on which the display 100 is disposed is defined as a first surface or a front surface of the electronic device 10. A surface facing away from the front surface is defined as a second surface or a rear surface of the electronic device 10. Furthermore, a surface surrounding a space between the front surface and the rear surface is defined as a third surface or a side surface of the electronic device 10.

In certain embodiments, the foldable housing 500 may include a first housing structure 510, a second housing structure 520 including a sensor area 524, a first back cover 580, and a second back cover 590. The foldable housing 500 of the electronic device 10 is not limited to the form and coupling illustrated in FIGS. 1 and 2 and may be implemented by a combination and/or coupling of other shapes or components. For example, in certain embodiments, the first housing structure 510 and the first back cover 580 may be integrally formed with each other, and the second housing structure 520 and the second back cover 590 may be integrally formed with each other.

In the illustrated embodiment, the first housing structure 510 and the second housing structure 520 may be disposed on opposite sides with respect to a folding axis (an axis A) and may have entirely symmetrical shapes with respect to the folding axis A. As described below, the angle or distance between the first housing structure 510 and the second housing structure 520 may vary depending on whether the electronic device 10 is in an unfolded state, a folded state, or an intermediate state (or, a partially folded state). In the illustrated embodiment, unlike the first housing structure 510, the second housing structure 520 may additionally include the sensor area 524 in which various sensors are disposed. However, the first housing structure 510 and the second housing structure 520 may have mutually symmetrical shapes in the other areas.

In certain embodiments, as illustrated in FIG. 1, the first housing structure 510 and the second housing structure 520 may form a recess in which the display 100 is accommodated. In the illustrated embodiment, due to the sensor area 524, the recess may have two or more different widths in a direction perpendicular to the folding axis A.

For example, the recess may have (1) a first width w1 between a first portion 510a of the first housing structure 510 that is parallel to the folding axis A and a first portion 520a of the second housing structure 520 that is formed on the periphery of the sensor area 524 and (2) a second width w2 formed by a second portion 510b of the first housing structure 510 and a second portion 520b of the second housing structure 520 that does not correspond to the sensor area 524 and that is parallel to the folding axis A. In this case, the second width w2 may be greater than the first width w1. In other words, the first portion 510a of the first housing structure 510 and the first portion 520a of the second housing structure 520 that have mutually asymmetrical shapes may form the first width w1 of the recess, and the second portion 510b of the first housing structure 510 and the second portion 520b of the second housing structure 520 that have mutually symmetrical shapes may form the second width w2 of the recess. In certain embodiments, the first portion 520a and the second portion 520b of the second housing structure 520 may have different distances from the folding axis A. The width of the recess is not limited to the illustrated example. In various embodiments, the recess may have a plurality of widths depending on the form of the sensor area 524 or the asymmetrical portions of the first housing structure 510 and the second housing structure 520.

In certain embodiments, at least a portion of the first housing structure 510 and at least a portion of the second housing structure 520 may be formed of a metallic or non-metallic material having a stiffness of a selected magnitude to support the display 100.

In certain embodiments, the sensor area 524 may be formed to have a predetermined area adjacent to one corner of the second housing structure 520. However, the arrangement, shape, and size of the sensor area 524 are not limited to the illustrated example. For example, in certain embodiments, the sensor area 524 may be provided in another corner of the second housing structure 520 or in any area between an upper corner and a lower corner of the second housing structure 520. In certain embodiments, components embedded in the electronic device 10 to perform various functions may be exposed on the front surface of the electronic device 10 through the sensor area 524 or one or more openings formed in the sensor area 524. In various embodiments, the components may include various types of sensors. The sensors may include, for example, at least one of a front camera, a receiver, or a proximity sensor.

The first back cover 580 may be disposed on one side of the folding axis on the rear surface of the electronic device 10. For example, the first back cover 580 may have a substantially rectangular periphery, and the periphery may be surrounded by the first housing structure 510. Similarly, the second back cover 590 may be disposed on an opposite side of the folding axis on the rear surface of the electronic device 10, and the periphery of the second back cover 590 may be surrounded by the second housing structure 520.

In the illustrated embodiment, the first back cover 580 and the second back cover 590 may have substantially symmetrical shapes with respect to the folding axis (the axis A). However, the first back cover 580 and the second back cover 590 do not necessarily have to have mutually symmetrical shapes. In certain embodiments, the electronic device 10 may include the first back cover 580 and the second back cover 590 in various shapes. In certain embodiments, the first back cover 580 may be integrally formed with the first housing structure 510, and the second back cover 590 may be integrally formed with the second housing structure 520.

In certain embodiments, the first back cover 580, the second back cover 590, the first housing structure 510, and the second housing structure 520 may form a space in which various components (e.g., a printed circuit board or a battery) of the electronic device 10 are disposed. In certain embodiments, one or more components may be disposed, or visually exposed, on the rear surface of the electronic device 10. For example, at least a portion of a sub-display 190 may be visually exposed through a first rear area 582 of the first back cover 580. In certain embodiments, one or more components or sensors may be visually exposed through a second rear area 592 of the second back cover 590. In various embodiments, the sensors may include a proximity sensor and/or a rear camera.

Referring to FIG. 2, the hinge cover 530 may be disposed between the first housing structure 510 and the second housing structure 520 and may be configured to hide an internal component (e.g., a hinge structure). In certain embodiments, the hinge cover 530 may be hidden by a portion of the first housing structure 510 and a portion of the second housing structure 520, or may be exposed to the outside, depending on a state (e.g., an unfolded state or a flat state, or a folded state) of the electronic device 10.

For example, when the electronic device 10 is in an unfolded state as illustrated in FIG. 1, the hinge cover 530 may be hidden by the first housing structure 510 and the second housing structure 520 and may not be exposed. In another example, when the electronic device 10 is in a folded state (e.g., a fully folded state) as illustrated in FIG. 2, the hinge cover 530 may be exposed to the outside from between the first housing structure 510 and the second housing structure 520. In another example, when the electronic device 10 is in an intermediate state in which the first housing structure 510 and the second housing structure 520 are folded with a certain angle, a portion of the hinge cover 530 may be exposed to the outside from between the first housing structure 510 and the second housing structure 520. However, in this case, the exposed area may be smaller than that when the electronic device 10 is in the fully folded state. In certain embodiments, the hinge cover 530 may include a curved surface.

The display 100 may be disposed over the space formed by the foldable housing 500. For example, the display 100 may be seated over the recess formed by the foldable housing 500 and may form most of the front surface of the electronic device 10.

Accordingly, the front surface of the electronic device 10 may include the display 100, and a partial area of the first housing structure 510 and a partial area of the second housing structure 520 that are adjacent to the display 100. The rear surface of the electronic device 10 may include the first back cover 580, a partial area of the first housing structure 510 that is adjacent to the first back cover 580, the second back cover 590, and a partial area of the second housing structure 520 that is adjacent to the second back cover 590.

The display 100 may refer to a display, at least a partial area of which is able to be deformed to be flat or curved. In certain embodiments, the display 100 may include a folding area 103, a first area 101 disposed on one side with respect to the folding area 103 (on the left side of the folding area 103 illustrated in FIG. 1), and a second area 102 disposed on an opposite side with respect to the folding area 103 (on the right side of the folding area 103 illustrated in FIG. 1).

The division of the display 100 into the areas illustrated in FIG. 1 is illustrative, and the display 100 may be divided into a plurality of areas (e.g., four or more areas, or two areas) depending on the structure or function of the display 100. For example, in the embodiment illustrated in FIG. 1, the areas of the display 100 may be divided from each other by the folding area 103 or the folding axis (the axis A) that extends parallel to the y-axis. However, in certain embodiments, the display 100 may be divided into areas with respect to another folding area (e.g., a folding area parallel to the x-axis) or another folding axis (e.g., a folding axis parallel to the x-axis).

The first area 101 and the second area 102 may have entirely symmetrical shapes with respect to the folding area 103. However, unlike the first area 101, the second area 102 may include a notch that is cut depending on the presence of the sensor area 524, and in the other area, the second area 102 may have a shape symmetrical to the shape of the first area 101. In other words, the first area 101 and the second area 102 may include portions having mutually symmetrical shapes and portions having mutually asymmetrical shapes.

Hereinafter, operations of the first housing structure 510 and the second housing structure 520 and the areas of the display 100 depending on a state (e.g., an unfolded state or a folded state) of the electronic device 10 are described.

In certain embodiments, when the electronic device 10 is in an unfolded state (e.g., FIG. 1), the first housing structure 510 and the second housing structure 520 may be disposed to face the same direction while forming an angle of 180 degrees. A surface of the first area 101 and a surface of the second area 102 of the display 100 may face the same direction (e.g., the direction toward the front surface of the electronic device) while forming an angle of 180 degrees. The folding area 103 may form the same plane as the first area 101 and the second area 102.

In certain embodiments, when the electronic device 10 is in a folded state (e.g., FIG. 2), the first housing structure 510 and the second housing structure 520 may be disposed to face each other. The surface of the first area 101 and the surface of the second area 102 of the display 100 may face each other while forming a narrow angle (e.g., an angle between 0 degrees and 10 degrees). At least a portion of the folding area 103 may be curved to have a predetermined curvature.

In certain embodiments, when the electronic device 10 is in an intermediate state (e.g., FIG. 2), the first housing structure 510 and the second housing structure 520 may be disposed at a certain angle. The surface of the first area 101 and the surface of the second area 102 of the display 100 may form an angle greater than that in the folded state and smaller than that in the unfolded state. At least a portion of the folding area 103 may be curved to have a predetermined curvature, and the curvature may be smaller than that in the folded state.

Figure 3:
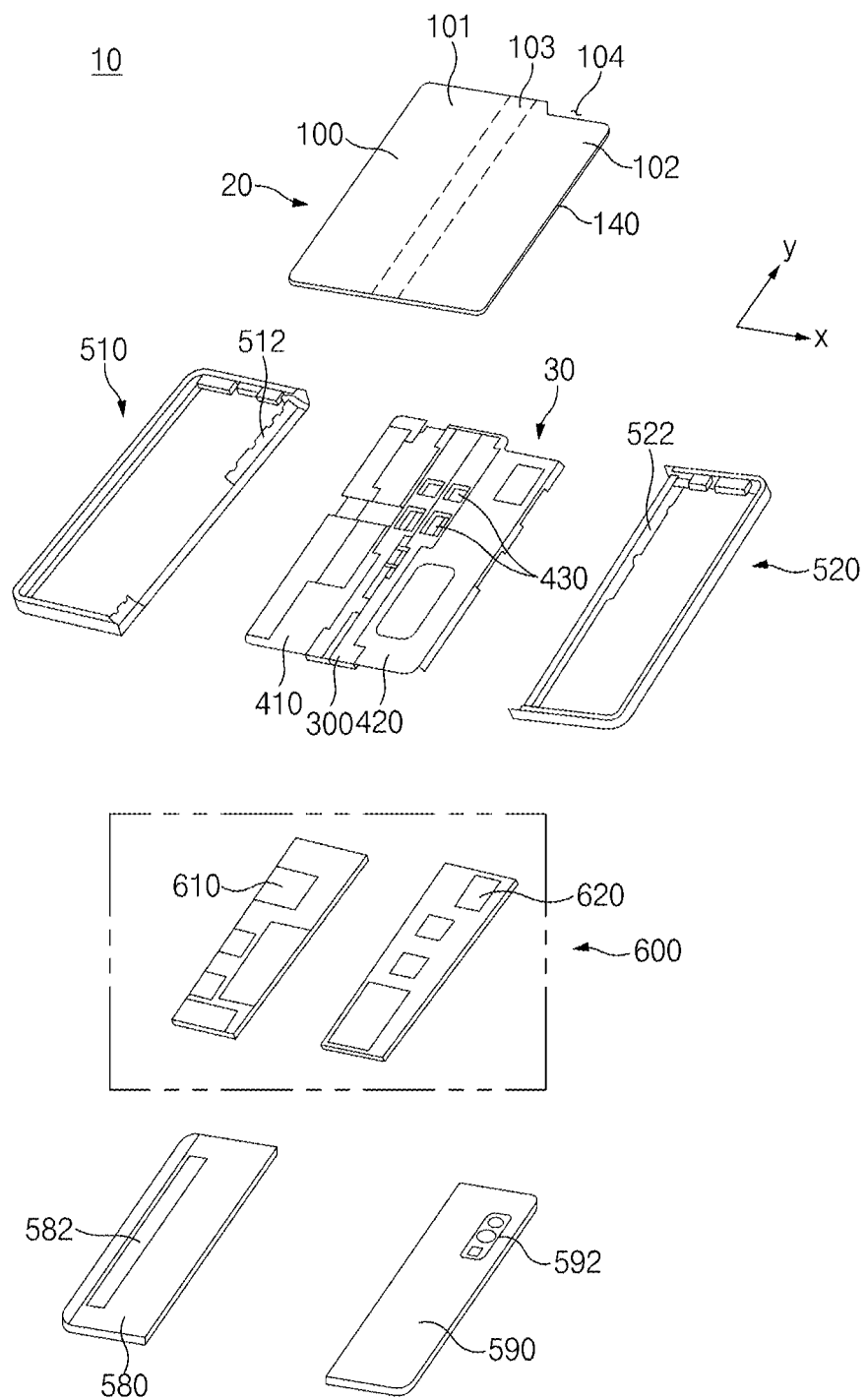
FIG. 3 is an exploded perspective view of the electronic device according to various embodiments of the present disclosure.

FIG. 3 is an exploded perspective view of the electronic device according to various embodiments of the present disclosure.

Referring to FIG. 3, in certain embodiments, the electronic device 10 may include a display unit 20, a bracket assembly 30, a circuit board 600, the first housing structure 510, the second housing structure 520, the first back cover 580, and the second back cover 590. In this disclosure, the display unit 20 may be referred to as the display module or the display assembly.

The display unit 20 may include the display 100 and at least one plate or layer 140 on which the display 100 is seated. In certain embodiments, the plate 140 may be disposed between the display 100 and the bracket assembly 30. The display 100 may be disposed on at least a portion of one surface (e.g., an upper surface with respect to FIG. 3) of the plate 140. The plate 140 may be formed in a shape corresponding to the display 100. For example, a partial area of the plate 140 may be formed in a shape corresponding to a notch 104 of the display 100.

The bracket assembly 30 may include a first bracket 410, a second bracket 420, a hinge structure disposed between the first bracket 410 and the second bracket 420, the hinge cover 530 that covers the hinge structure when viewed from the outside, and a wiring member 430 (e.g., a flexible printed circuit (FPC)) across the first bracket 410 and the second bracket 420.

In certain embodiments, the bracket assembly 30 may be disposed between the plate 140 and the circuit board 600. For example, the first bracket 410 may be disposed between the first area 101 of the display 100 and a first circuit board 610. The second bracket 420 may be disposed between the second area 102 of the display 100 and a second circuit board 620.

In certain embodiments, at least a portion of the wiring members 430 and at least a portion of the hinge structure 300 may be disposed inside the bracket assembly 30. The wiring member 430 may be disposed in a direction (e.g., the x-axis direction) across the first bracket 410 and the second bracket 420. The wiring member 430 may be disposed in a direction (e.g., the x-axis direction) perpendicular to the folding axis (e.g., the y-axis or the folding axis A of FIG. 1) of the folding area 103 of the electronic device 10.

The circuit board 600, as mentioned above, may include the first circuit board 610 disposed on one side of the first bracket 410 and the second circuit board 620 disposed on one side of the second bracket 420. The first circuit board 610 and the second circuit board 620 may be disposed in a space formed by the bracket assembly 30, the first housing structure 510, the second housing structure 520, the first back cover 580, and the second back cover 590. Components for implementing various functions of the electronic device 10 may be mounted on the first circuit board 610 and the second circuit board 620.

The first housing structure 510 and the second housing structure 520 may be assembled together so as to be coupled to opposite sides of the bracket assembly 30 in the state in which the display unit 20 is coupled to the bracket assembly 30. As will be described below, the first housing structure 510 and the second housing structure 520 may be coupled with the bracket assembly 30 by sliding on the opposite sides of the bracket assembly 30.

In certain embodiments, the first housing structure 510 may include a first rotation support surface 512, and the second housing structure 520 may include a second rotation support surface 522 corresponding to the first rotation support surface 512. The first rotation support surface 512 and the second rotation support surface 522 may include a curved surface corresponding to the curved surface included in the hinge cover 530.

In certain embodiments, when the electronic device 10 is in an unfolded state (e.g., the electronic device of FIG. 1), the first rotation support surface 512 and the second rotation support surface 522 may cover the hinge cover 530, and the hinge cover 530 may not be exposed, or may be minimally exposed, on the rear surface of the electronic device 10. Meanwhile, when the electronic device 10 is in a folded state (e.g., the electronic device of FIG. 2), the first rotation support surface 512 and the second rotation support surface 522 may rotate along the curved surface included in the hinge cover 530, and the hinge cover 530 may be exposed on the rear surface of the electronic device 10 to the maximum.

FIGS. 4A to 4F are views illustrating folded states and unfolded states of foldable electronic devices 10 (e.g., an electronic device 901 of FIG. 17) according to various embodiments of the present disclosure.

Figure 4A:
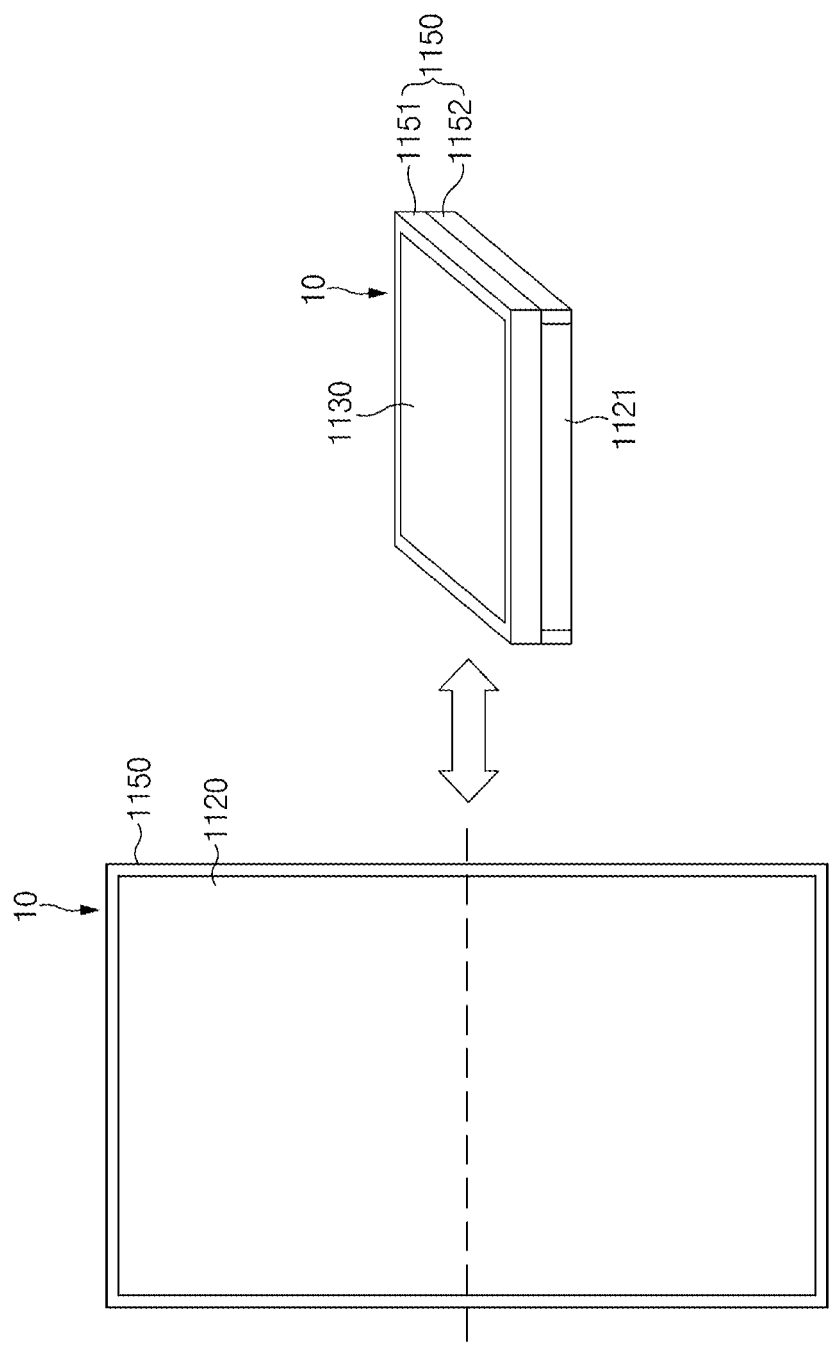
FIG. 4A is a view illustrating a folding motion and a folded state of a foldable electronic device according to various embodiments of the present disclosure.
Figure 4B:
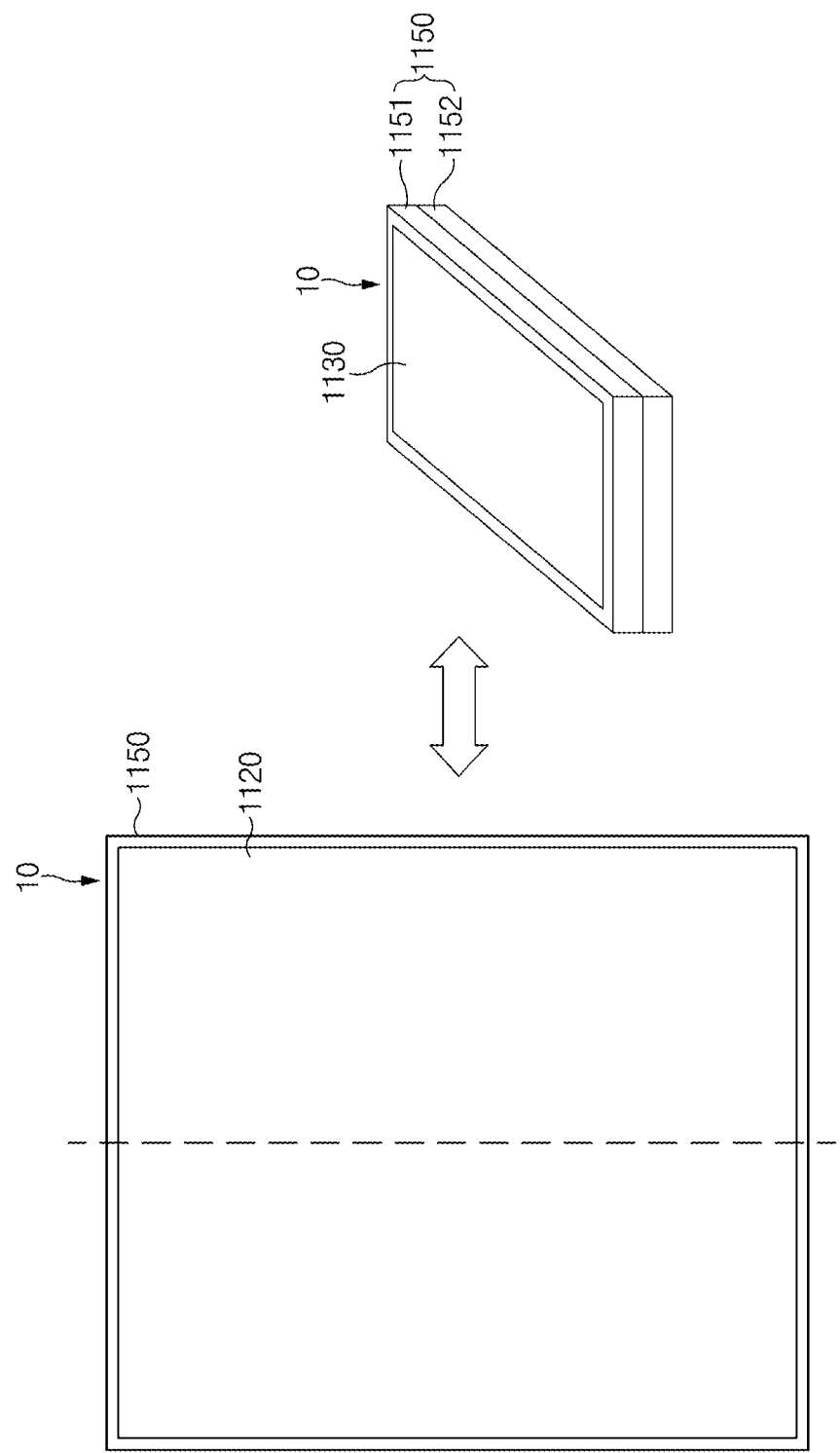
FIG. 4B is a view illustrating a folding motion and a folded state of a foldable electronic device according to various embodiments of the present disclosure.

In various embodiments, referring to FIGS. 4A and 4B, a foldable housing 1150 (e.g., the foldable housing 500 of FIG. 1) may include a first housing 1151 (e.g., the first housing structure 510 of FIG. 1) and a second housing 1152 (e.g., the second housing structure 520 of FIG. 1) that have a same size and shape, and the first housing 1151 may be connected (e.g., hinge-coupled) with at least a portion of the second housing 1152 so as to be foldable. When folded such that a first surface of the first housing 1151 and a first surface of the second housing 1152 face each other, the foldable housing 1150 may be symmetrically folded such that an exposed area 1121 of a first display 1120 disposed on the first surfaces is not exposed toward a second display 1130. At this time, to have the exposed area 1121 of a predetermined size, the first display 1120 may be disposed on a first surface of the foldable housing 1150 and a third surface including at least one of side surfaces of the foldable housing 1150 (e.g., may be disposed on the first surface of the foldable housing 1150 and the third surface that connects the first surface of the second housing 1152 and the second surface of the second housing 1152 and forms a side surface of the foldable electronic device 10).

Figure 4C:
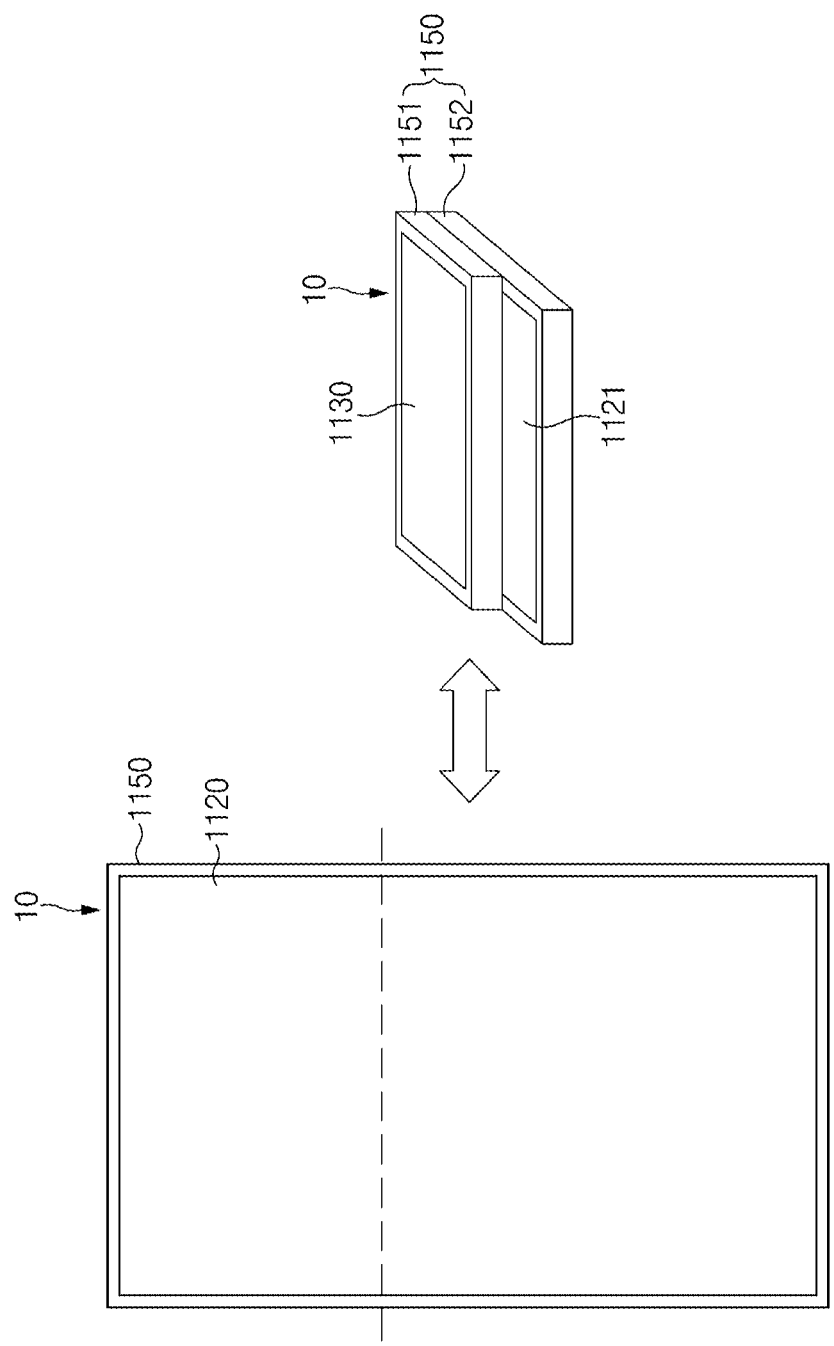
FIG. 4C is a view illustrating a folding motion and a folded state of a foldable electronic device according to various embodiments of the present disclosure.
Figure 4D:
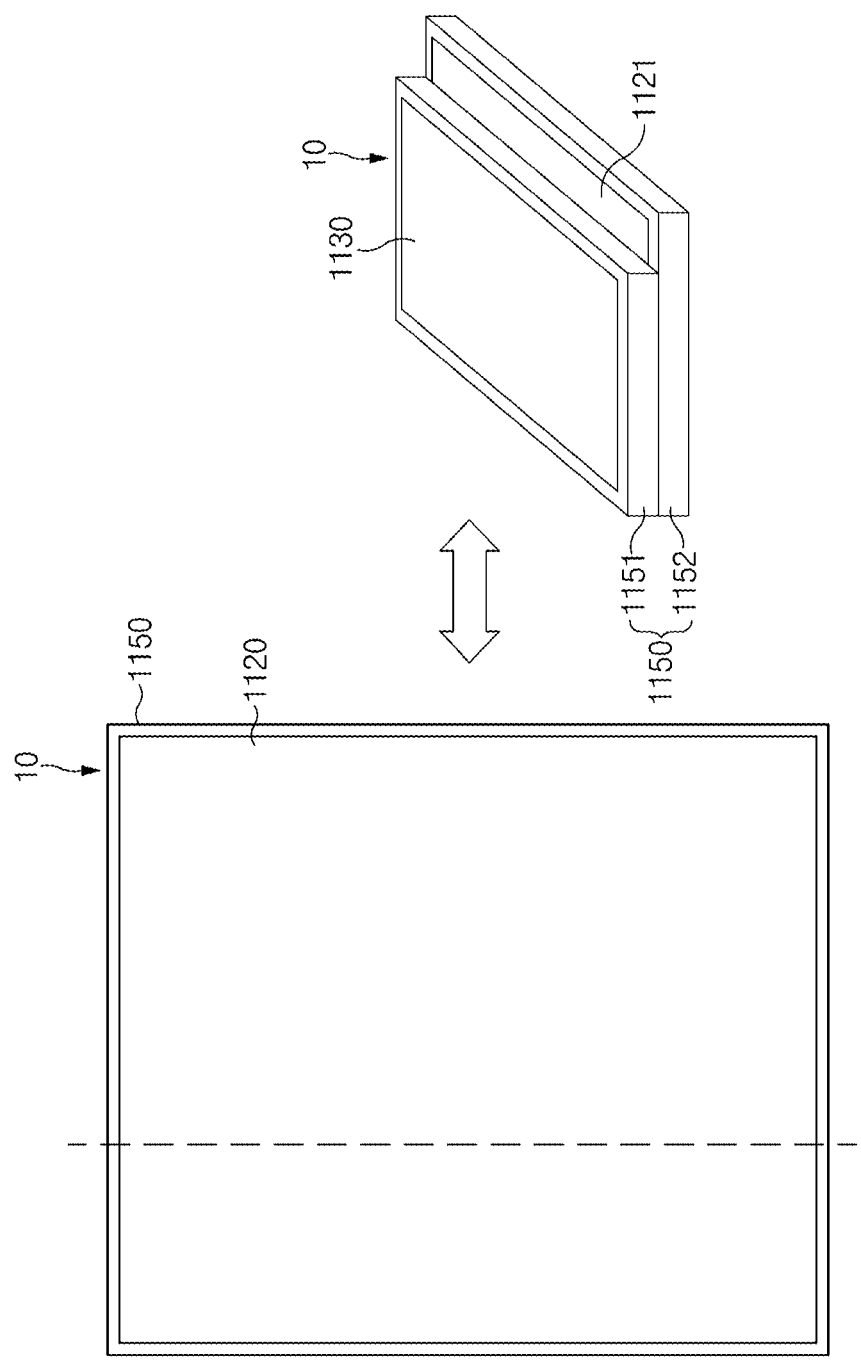
FIG. 4D is a view illustrating a folding motion and a folded state of a foldable electronic device according to various embodiments of the present disclosure.

In various embodiments, referring to FIGS. 4C and 4D, a foldable housing 1150 may include a first housing 1151 and a second housing 1152 larger than the first housing 1151, and the first housing 1151 may be connected (e.g., hinge-coupled) with at least a portion of the second housing 1152 so as to be foldable. When folded such that a first surface of the first housing 1151 and a first surface of the second housing 1152 face each other, the foldable housing 1150 may be asymmetrically folded such that an exposed area 1121 of a first display 1120 disposed on the first surfaces is exposed toward a second display 1130.

Figure 4E:
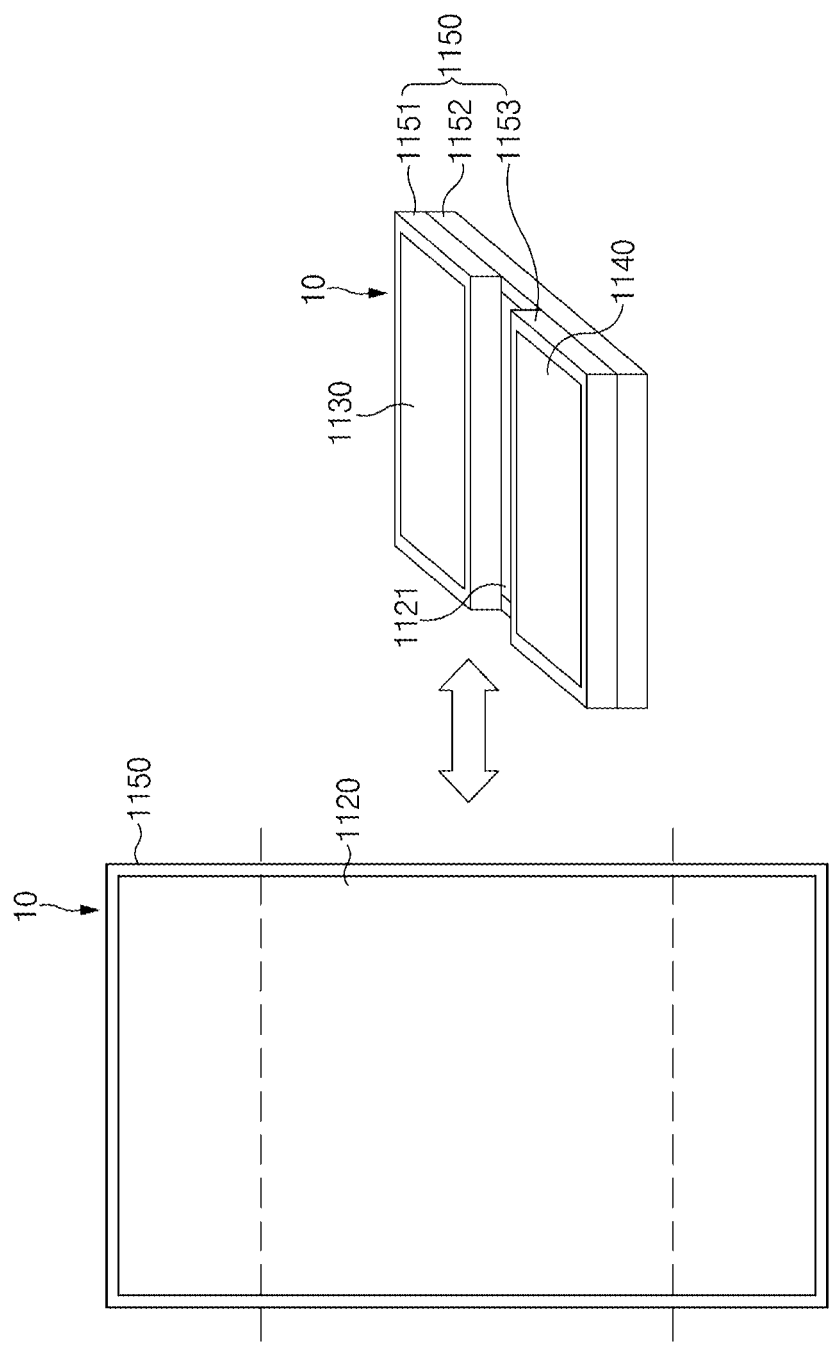
FIG. 4E is a view illustrating a folding motion and a folded state of a foldable electronic device according to various embodiments of the present disclosure.

In various embodiments, referring to FIGS. 4E and 4F, a foldable housing 1150 may include a first housing 1151, a second housing 1152 connected with at least a portion of the first housing 1151 so as to be foldable, and a third housing 1153 located on the opposite side to the first housing 1151 with respect to the second housing 1152 and at least partially connected with the second housing 1152 so as to be foldable. The foldable housing 1150 may be folded such that a first surface of the first housing 1151 and a first surface of the second housing 1152 face each other and a first surface of the third housing 1153 and the first surface of the second housing 1152 face each other. When the sum of the size of the first housing 1151 and the size of the third housing 1153 is smaller than the size of the second housing 1152, the foldable housing 1150 may be asymmetrically folded such that an exposed area 1121 of a first display 1120 is exposed toward a second display 1130 and a third display 1140 as illustrated in FIG. 4E. Alternatively, when the sum of the size of the first housing 1151 and the size of the third housing 1153 is equal to the size of the second housing 1152, the foldable housing 1150 may be symmetrically folded such that the exposed area 1121 of the first display 1120 is not exposed toward the second display 1130 and the third display 1140 as illustrated in FIG. 4F.

Figure 5:
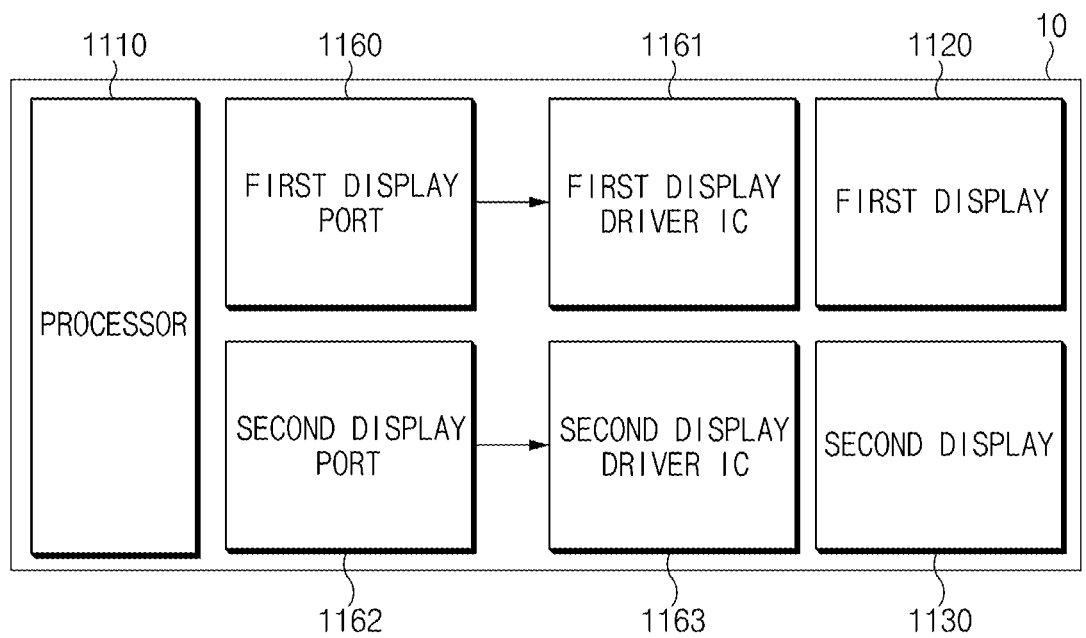
FIG. 5 is a view illustrating a display driver module of a foldable electronic device according to various embodiments of the present disclosure.

FIG. 5 is a view illustrating a display driver module of a foldable electronic device 10 (e.g., the electronic device 901 of FIG. 17) according to various embodiments of the present disclosure.

Figure 17:
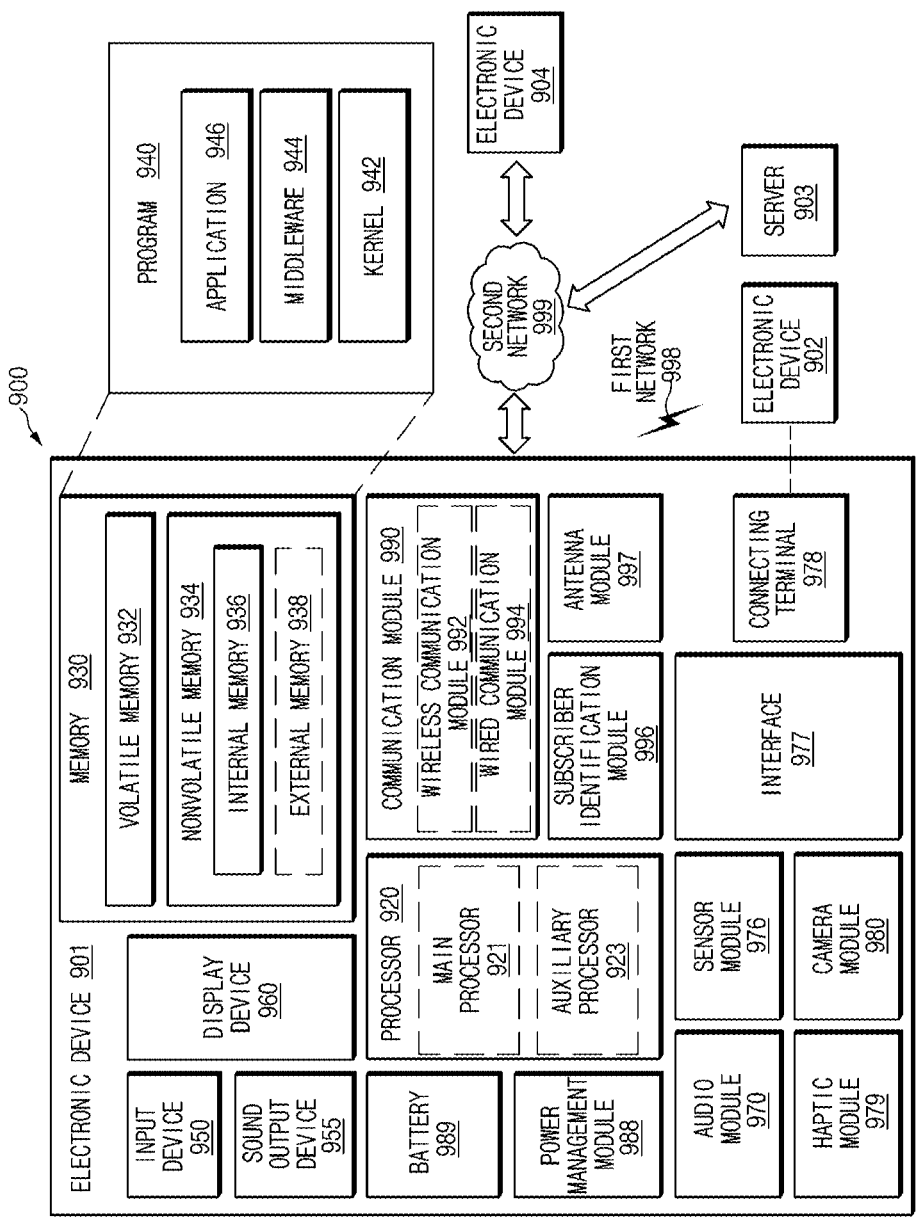
FIG. 17 is a block diagram of an electronic device in a network environment according to various embodiments of the present disclosure.

Referring to FIG. 5, the foldable electronic device 10 according to various embodiments may include a processor 1110 (e.g., a processor 920 of FIG. 17), a first display 1120, and a second display 1130 (e.g., a display device 960 of FIG. 17).

In certain embodiments, the processor 1110 may control outputs of the first display 1120 and the second display 1130 as the folding angle of a foldable housing 1150 (e.g., the foldable housing 500 of FIG. 1) is changed. For example, the processor 1110 may perform control through a first display port 1160 such that a first display driver IC 1161 drives the first display 1120. Furthermore, the processor 1110 may perform control through a second display port 1162 such that a second display driver IC 1163 drives the second display 1130.

In certain embodiments, the first display 1120 may be disposed on a first surface of the foldable housing 1150, and the second display 1130 may be disposed on a second surface of the foldable housing 1150.

In various embodiments, the first display 1120 may be disposed over the entire first surfaces of a first housing 1151 (e.g., the first housing structure 510 of FIG. 1) and a second housing 1152 (e.g., the second housing structure 520 of FIG. 1) that are included in the foldable housing 1150 and may be formed to be foldable depending on a folding or unfolding motion of the first housing 1151 and the second housing 1152. Furthermore, the second display 1130 may be disposed on a second surface of the foldable housing 1150 that faces away from the first surfaces. The second display 1130 may be disposed on at least a portion of the second surface (e.g., at least a portion of a second surface of the first housing 1151).

In various embodiments, the second display 1130 may have a different resolution from the first display 1120. Although the foldable electronic device 10 illustrated in FIG. 5 is illustrated as including the two displays 1120 and 1130, the foldable electronic device is not limited thereto and may include three or more displays.

Figure 6:
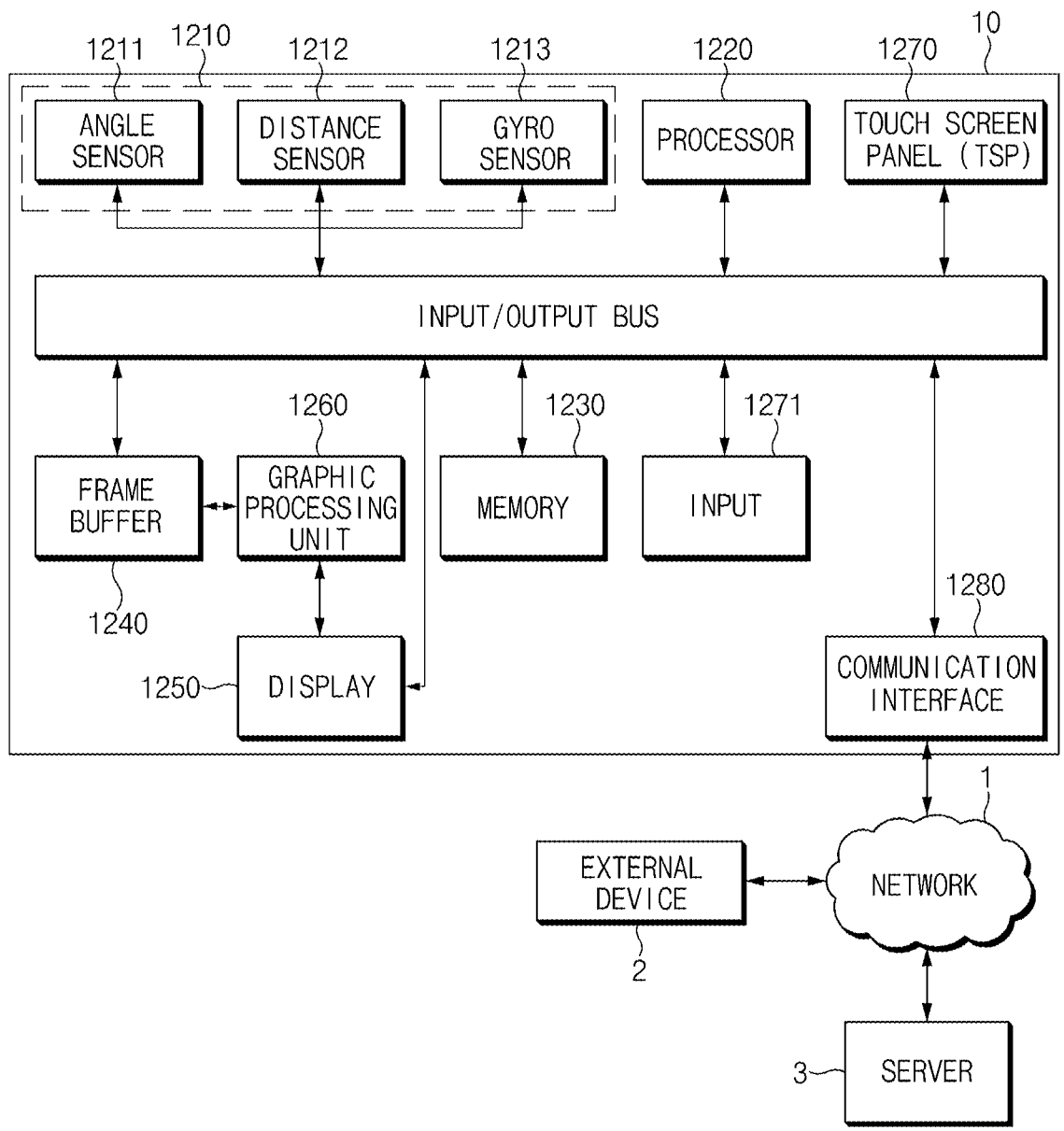
FIG. 6 is a view illustrating a hardware configuration of a foldable electronic device according to various embodiments of the present disclosure.

FIG. 6 is a view illustrating a hardware configuration of a foldable electronic device 10 (e.g., the electronic device 901 of FIG. 17) according to various embodiments.

Referring to FIG. 6, the foldable electronic device 10 according to various embodiments may include a plurality of sensors 1210 (e.g., a sensor module 976 of FIG. 17), a processor 1220 (e.g., the processor 920 of FIG. 17), memory 1230 (e.g., memory 930 of FIG. 17), a frame buffer 1240, a display 1250 (e.g., the display device 960 of FIG. 17), a graphic processing unit 1260, a touch screen panel 1270, and a communication interface 1280 (e.g., a communication module 990 of FIG. 17).

In certain embodiments, the plurality of sensors 1210 may sense a folding angle of a foldable housing 1150. For example, the sensors 1210 may include at least one of an angle sensor 1211, a distance sensor 1212, or a gyroscope sensor 1213. However, the disclosure is not limited thereto, and any sensor capable of sensing the folding angle of the foldable housing 1150 is applicable (e.g., a Hall sensor).

In certain embodiments, the processor 1220 may sense the current folding angle of the foldable housing 1150 and a change in the folding angle of the foldable housing 1150 by using the folding angle sensed through the sensors 1210. Furthermore, the processor 1220 may perform overall control operation on the components included in the foldable electronic device 10.

In certain embodiments, the memory 1230 may include at least one of volatile memory or non-volatile memory. Various instructions or data related to control operation of the foldable electronic device 10 may be stored in the memory 1230.

In certain embodiments, the frame buffer 1240 may store a pixel color value to be output on the display 1250. For example, the frame buffer 1240 may be located inside the graphic processing unit (GPU) 1260 or may be implemented with the memory 1230 or a virtual device such as a frame buffer device of Linux.

In certain embodiments, the graphic processing unit 1260 may configure graphic information of a window output on the display 1250. Here, the graphic processing unit 1260 may be separately configured to rapidly and efficiently configure the graphic information of the window or may be omitted as needed.

In certain embodiments, the touch screen panel 1270 may receive a user input for selecting a specific application from a user. For example, the touch screen panel 1270 may be integrally formed with the display 1250 and may recognize a signal (e.g., a touch signal) input through the display 1250 as an input 1271.

In certain embodiments, the communication interface 1280 may perform wired/wireless communication with components external to the foldable electronic device 10. For example, the communication interface 1280 may perform wired/wireless communication with an external device 2 or a server 3 through a network 1.

Figure 7:
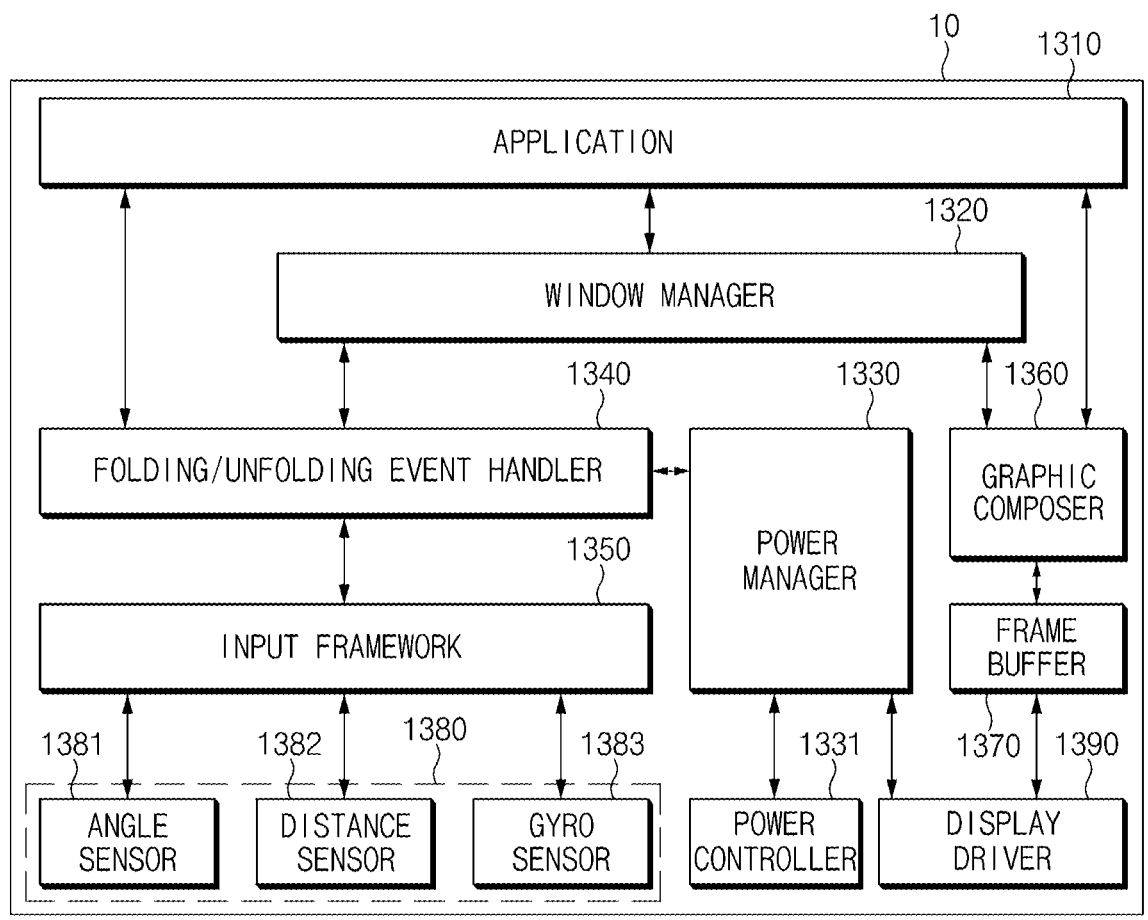
FIG. 7 is a view illustrating a software configuration of a foldable electronic device according to various embodiments of the present disclosure.

FIG. 7 is a view illustrating a software configuration of a foldable electronic device 10 (e.g., the electronic device 901 of FIG. 17) according to various embodiments.

Referring to FIG. 7, the foldable electronic device 10 according to various embodiments may include a window manager 1320, a power manager 1330, a folding/unfolding event handler 1340, an input framework 1350, a graphic composer 1360, a frame buffer 1370, one or more sensors 1380, and a display driver 1390. For example, the one or more sensors 1380 may include at least one of an angle sensor 1381, a distance sensor 1382, or a gyroscope sensor 1383

In certain embodiments, the window manager 1320 may control a state of a display that outputs an execution screen of an application 1310 (e.g., the brightness, the horizontal length, the vertical length, rotation, and the pixel density of the display). Furthermore, the window manager 1320 may determine window settings including at least one of the size, the position, or the transparency of a multi-window represented on the display and each of windows included in the multi-window and may perform a control command for a display output depending on the window settings. Here, the window manager 1320 may be divided into a window manager and a display manager depending on the configuration of the foldable electronic device 10.

In certain embodiments, the power manager 1330 may adjust an electric current applied to each component of the foldable electronic device 10 according to certain embodiments. For example, the power manager 1330 may manage a power state of the entire foldable electronic device 10 or each component by controlling a power controller 1331 using clock frequency control.

In certain embodiments, the folding/unfolding event handler 1340 may perform on/off control on the display by using a folding angle of the foldable electronic device 10 sensed by the sensor 1380 and a change in the folding angle of the foldable electronic device 10. For example, the folding/unfolding event handler 1340 may transfer, to the display driver 1390, a display control signal that controls the on/off of the display depending on the folding angle of the foldable electronic device 10 and a change in the folding angle of the foldable electronic device 10, and the display driver 1390 may control the on/off of the display and a state of the display depending on the display control signal received from the folding/unfolding event handler 1340.

In certain embodiments, the input framework 1350 may receive an event indicating the folding angle of the foldable electronic device 10 sensed by the sensor 1380. Furthermore, the input framework 1350 may determine the folding angle of the foldable electronic device 10 using the event indicating the folding angle and may transfer the determined folding angle of the foldable electronic device 10 to the folding/unfolding event handler 1340.

In certain embodiments, the graphic composer 1360 may synthesize graphic information for each window output on the display and may transfer the synthesized graphic information to the frame buffer 1370, and the frame buffer 1370 may store the graphic information for the window that is transferred from the graphic composer 1360.

Figure 8:
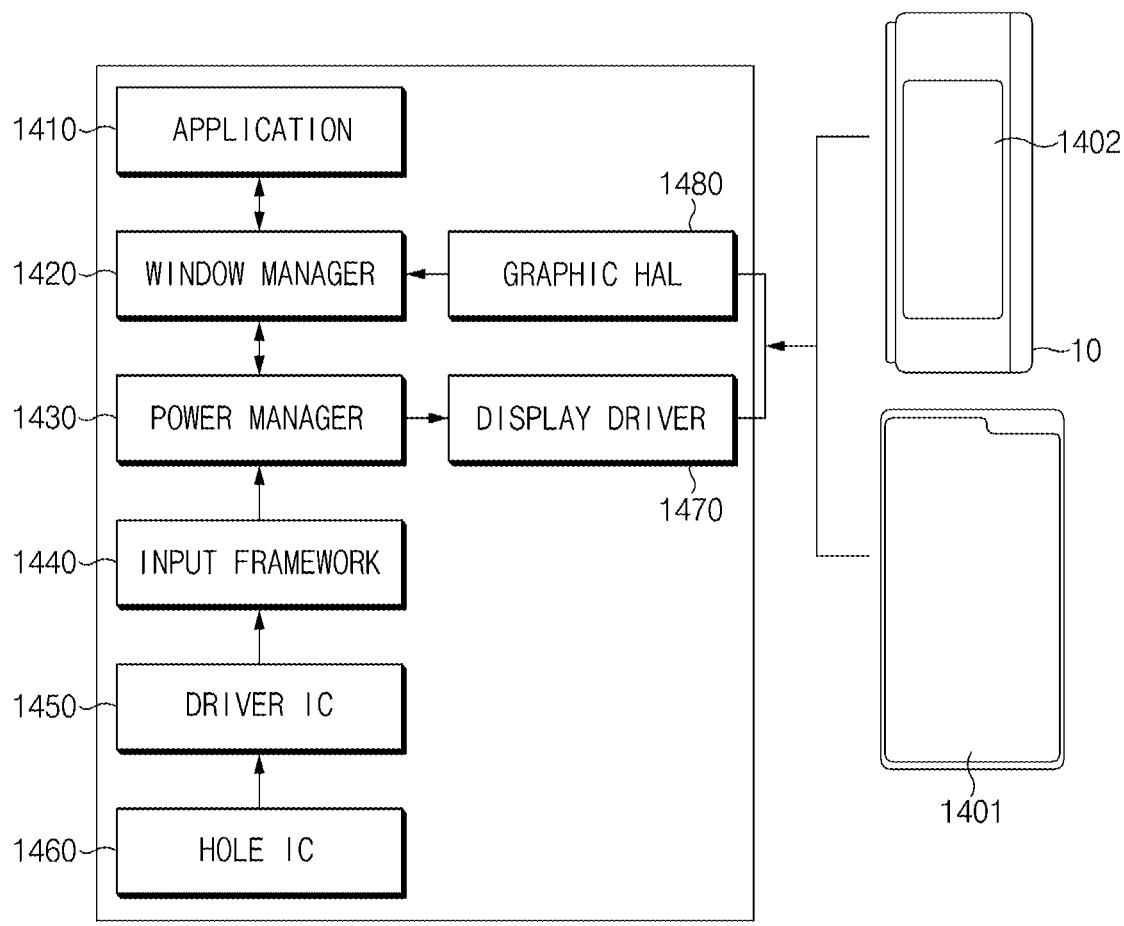
FIG. 8 is a view illustrating a module performing a display switching operation in a foldable electronic device according to various embodiments of the present disclosure.

FIG. 8 is a view illustrating a module performing a display switching operation in a foldable electronic device 10 (e.g., the electronic device 10 of FIG. 17) according to various embodiments.

Referring to FIG. 8, the foldable electronic device 10 may include a window manager 1420 (e.g., the window manager 1320 of FIG. 7), a power manager 1430 (e.g., the power manager 1330 of FIG. 7), an input framework 1440 (e.g., the input framework 1350 of FIG. 7), a driver IC 1450, a hole IC 1460, a display driver 1470 (e.g., the display driver 1390 of FIG. 7), and a graphic HAL 1480.

In certain embodiments, the window manager 1420 may receive an event indicating a folded or unfolded state of the foldable electronic device 10 and a request for display switching of the foldable electronic device 10 through the input framework 1440. Furthermore, the window manager 1420 may switch a screen output on a display depending on the display switching request and may output a switching screen (e.g., a monochromatic screen such as a black screen, a preset image, an image for requesting resetting of an application, a captured screen image, or a captured application image) for a preset period of time (e.g., while resetting of an execution screen of an application 1410 is completed).

In certain embodiments, the window manager 1420 may make a request to reset the execution screen of the application 1410 output on the display depending on information of the switched display. Furthermore, the window manager 1420, after making the request for the resetting, may remain in a standby state until the resetting of the execution screen of the application 1410 is completed and may remove the switching screen that is output on the display in response to the completion of the resetting of the execution screen of the application 1410. For example, the window manager 1420 may remove the switching screen using an animation effect.

In certain embodiments, the power manager 1430 may control on/off states of a first display 1401 and a second display 1402 using the display switching request. For example, the power manager 1430 may control the display driver 1470 such that on/off states of the first display 1401 and the second display 1402 are changed.

In certain embodiments, the power manager 1430 may change on/off states of the first display 1401 and the second display 1402 and may simultaneously or sequentially perform an operation of changing the first display 1401 and the second display 1402 from a turned-on state to a turned-off state and an operation of changing the first display 1401 and the second display 1402 from a turned-off state to a turned-on state.

In certain embodiments, the power manager 1430 may provide control information for controlling the first display 1401 and the second display 1402 to a turned-on state to the window manager 1420 and may perform control such that the control information is recorded on memory associated with the displays controlled to the turned-on state. Furthermore, the power manager 1430 may perform an initialization operation on the first display 1401 and the second display 1402 before controlling the first display 1401 and the second display 1402 to a turned-on state, may determine whether information about the first display 1401 and the second display 1402 is recorded in the memory from the window manager 1420, and may control the first display 1401 and the second display 1402 to a turned-on state depending on whether the information about the displays is recorded.

In certain embodiments, the power manager 1430 may perform an operation of changing on/off states of the first display 1401 and the second display 1402, by controlling electric currents applied to the first display 1401 and the second display 1402 or controlling the brightness of light source elements of the first display 1401 and the second display 1402.

In various embodiments, the foldable electronic device 10 may allow the operation of the power manager 1430 to be performed by using driver ICs in the displays rather than the power manager 1430.

In certain embodiments, the graphic HAL 1480 may store various function values and software required for graphic processing and control of the first display 1401 and the second display 1402.

In certain embodiments, the display driver 1470 may drive the displays such that the first display 1401 and the second display 1402 are changed to a turned-on state or a turned-off state depending on the operation of changing on/off states of the first display 1401 and the second display 1402.

Figure 9:
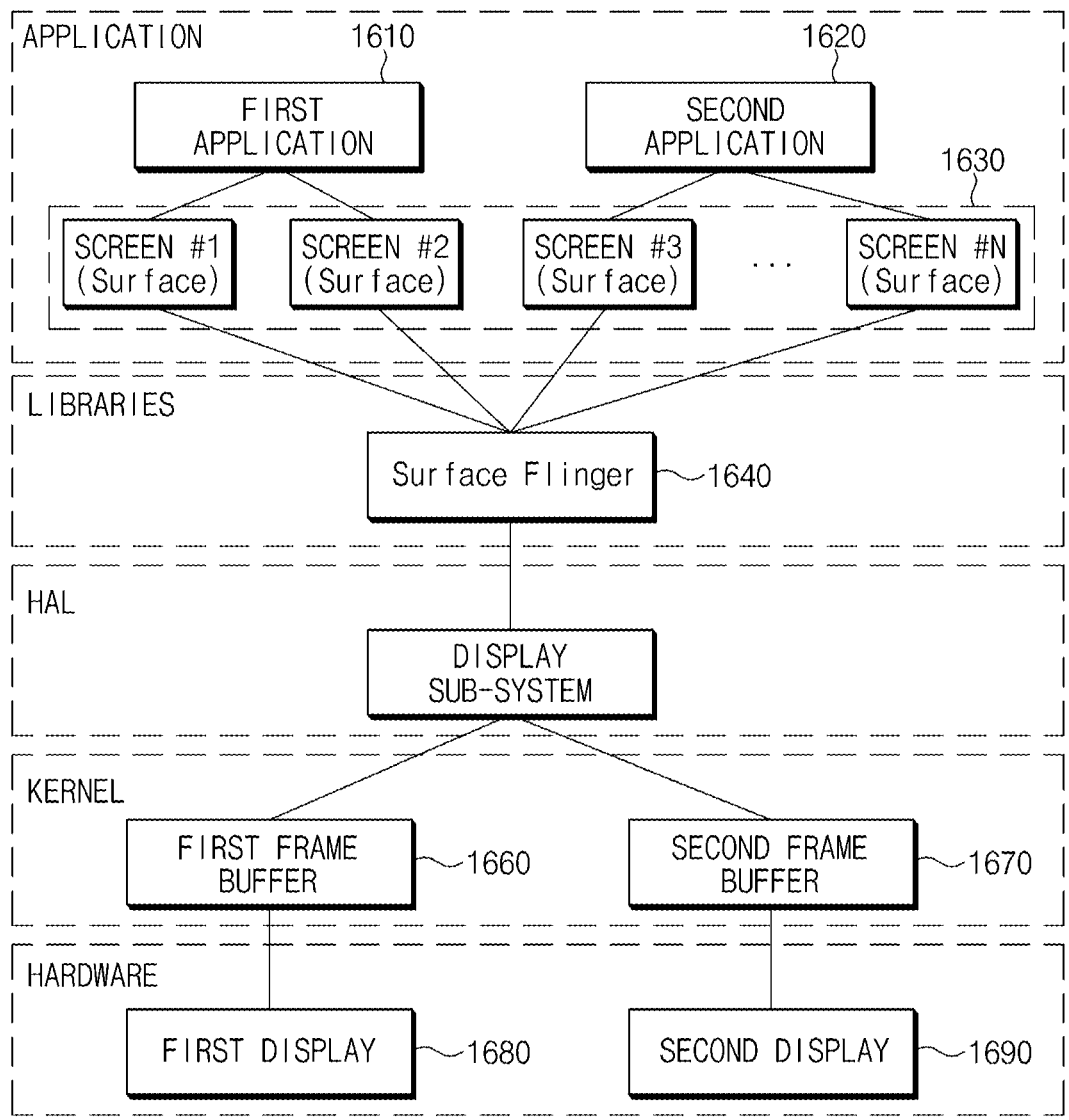
FIG. 9 is a view illustrating a module performing an operation of configuring a screen output on a display in a foldable electronic device according to various embodiments of the present disclosure.

FIG. 9 is a view illustrating a module performing an operation of configuring a screen output on a display in a foldable electronic device (e.g., the foldable electronic devices 10 of FIGS. 1 to 8 or the electronic device 901 of FIG. 17) according to various embodiments.

Referring to FIG. 9, in certain embodiments, a first frame buffer 1660 may include information about a screen output on a first display 1680, and a second frame buffer 1670 may include information about a screen output on a second display.

In certain embodiments, when a first application 1610 and a second application 1620 of an application layer are executed, each of the first application 1610 and the second application 1620 may provide, as libraries, a plurality of screen objects 1630 for displaying information of the application. At this time, the plurality of screen objects 1630 may be allocated to a plurality of view objects corresponding to each application.

In certain embodiments, a surface flinger 1640 may combine the plurality of screen objects 1630 provided from the first application 1610 and the second application 1620 and may store screen display information for each of the first application 1610 and the second application 1620 in a memory area associated with one display. For example, the surface flinger 1640 may configure a memory area associated with a display corresponding to a minimum width value provided to a framework, by using a partial area of the first display 1680 and attribute information (e.g., resolution, pixel density, and the like) of the second display 1690. Furthermore, the surface flinger 1640 may configure a screen by combining the screen objects 1630 for an allocated area of the configured memory area.

In certain embodiments, the first application 1610 and the second application 1620 may be provided with the screen objects 1630, based on attribute information of the display, and the surface flinger 1640 may combine the screen objects 1630 provided to each of the first application 1610 and the second application 1620 and may separately store screen information in the first frame buffer 1660 associated with the first display 1680 and the second frame buffer 1670 associated with the second display 1690.

Figure 10:
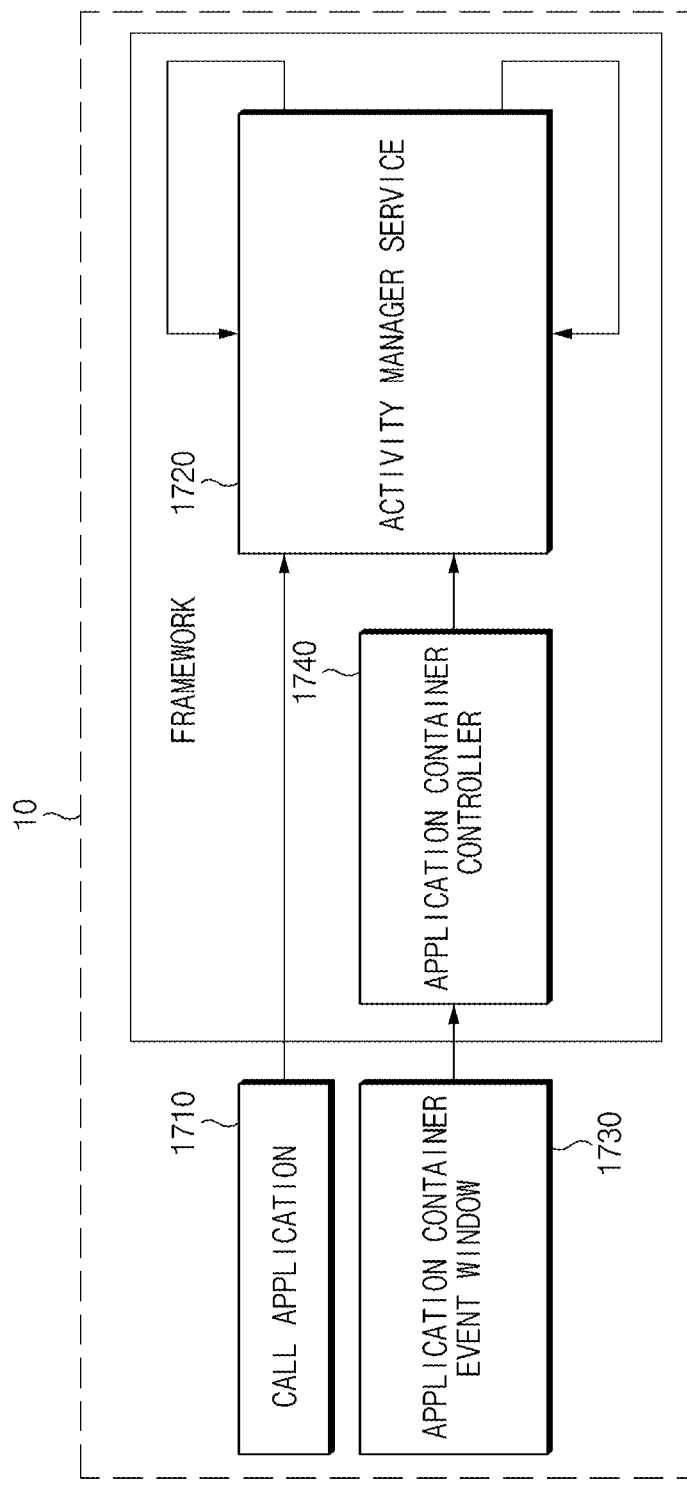
FIG. 10 is a view illustrating a multi-window execution module of a foldable electronic device according to various embodiments of the present disclosure.

FIG. 10 is a view illustrating a multi-window execution module of a foldable electronic device (e.g., the foldable electronic devices 10 of FIGS. 1 to 8 or the electronic device 901 of FIG. 17) according to various embodiments.

Referring to FIG. 10, in certain embodiments, a call application 1710 may have a database for all applications that the foldable electronic device 10 is able to execute and may request execution of a specific application corresponding to a user input (e.g., a touch signal for selecting the specific application).

In certain embodiments, an activity manager service 1720 may include a plurality of application containers, may perform at least one of execution, activation, or removal of the specific application requested from the call application 1710, and may manage configuration of a life cycle and a layout of the application.

In certain embodiments, an application container event window 1730 may sense an event generated from outside the foldable electronic device 10 and may determine activation or deactivation of a specific application container corresponding to the event.

In certain embodiments, an application container controller 1740 may control activation or deactivation of the specific application container depending on activation or deactivation of the specific application container determined by the application container event window 1730 and may manage an activation state of the specific application container.

In various embodiments, to execute a multi-window on the foldable electronic device 10, the call application 1710 may transmit a request for execution of a specific application to an application container, and the activity manager service 1720 may execute the specific application in response to the request for the execution of the specific application.

The application container event window 1730 may request activation or deactivation of the application container from the application container controller 1740.

The application container controller 1740 may request the activity manager service 1720 to update life cycles of a plurality of applications included in the specific application container, by using activation or deactivation of the application container.

The activity manager service 1720 may update and manage the life cycles of the plurality of applications included in the specific application container.

Figure 11:
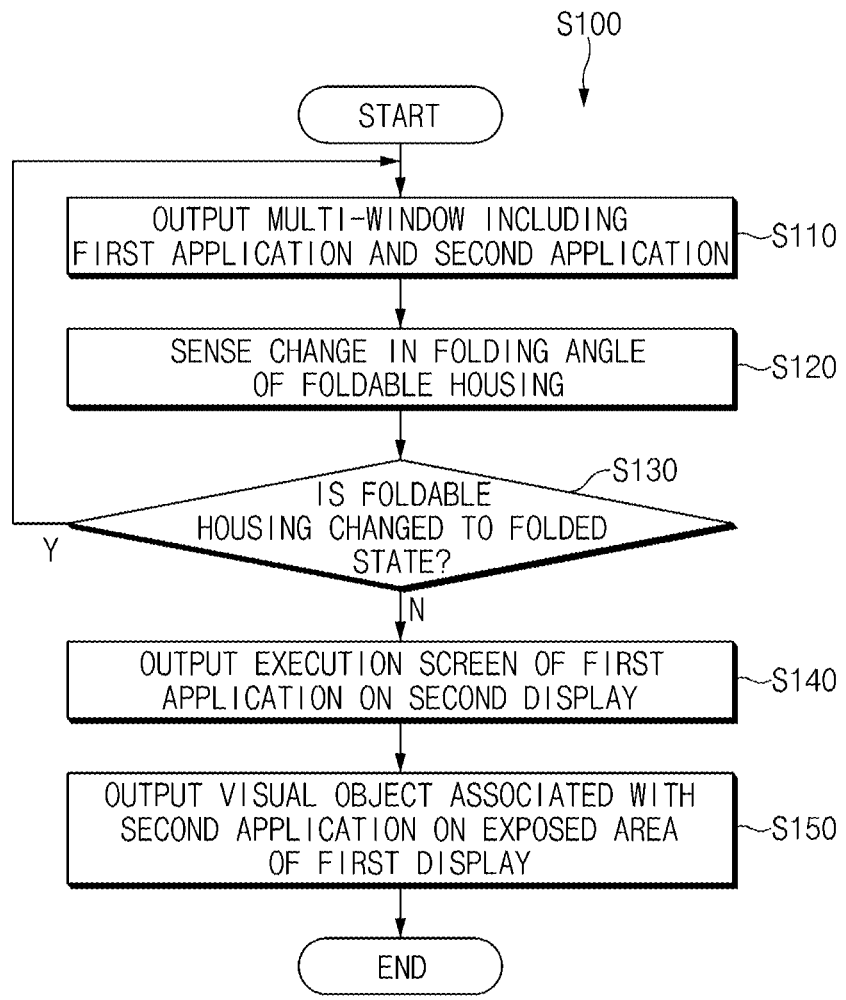
FIG. 11 is a flowchart illustrating a method for controlling a display as a foldable housing is changed from an unfolded state to a folded state according to various embodiments of the present disclosure.

FIG. 11 is a flowchart S100 illustrating a method for controlling a display as a foldable housing is changed from an unfolded state to a folded state according to various embodiments of the present disclosure.

Referring to FIG. 11, a foldable electronic device 10 may output a multi-window including a plurality of applications (S110). For example, when the foldable housing 1150 is in an unfolded state, the foldable electronic device 10 may output, on a first display 1120, a multi-window including a first window including an execution screen of a first application and a second window including an execution screen of a second application.

The foldable electronic device 10 may sense a folding angle of the foldable housing 1150 and a change in the folding angle (S120). For example, the foldable electronic device 10 may sense a change in the folding angle of the foldable housing 1150 by using folding angle information of the foldable housing 1150 sensed by at least one of a Hall sensor, an angle sensor, a distance sensor, or a gyroscope sensor.

The foldable electronic device 10 may determine whether the foldable housing 1150 is changed from the unfolded state to a folded state (S130).

In response to the change of the foldable housing 1150 to the folded state in step S130, the foldable electronic device 10 may output the execution screen of the first application on a second display 1130 (S140) and may output a visual object (e.g., an application execution icon) associated with the second application on an exposed area 1121 of the first display 1120 (S150).

In various embodiments, the foldable electronic device 10 may determine the exposed area 1121 using the folding angle of the foldable housing 1150 sensed by the sensor and may control the first display 1120 such that the visual object associated with the second application is output on the determined exposed area 1121. For example, when the foldable housing 1150 is symmetrically folded as illustrated in FIG. 4A and at least one area of the first display 1120 extending to the third surface of the foldable housing 1150 is exposed to the outside, the foldable electronic device 10 may determine the at least one area of the first display 1120 extending to the third surface of the foldable housing 1150 to be the exposed area 1121.

Furthermore, when the foldable housing 1150 is asymmetrically folded as illustrated in FIG. 4C and at least one area of the first display 1120 is exposed toward the first surface of the foldable housing 1150, the foldable electronic device 10 may determine at least a portion exposed toward the first surface of the foldable housing 1150 to be the exposed area 1121.

In various embodiments, the foldable electronic device 10 may set the number of visual objects of the second application output on the exposed area 1121, depending on the size of the exposed area 1121.

In various embodiments, the foldable electronic device 10 may determine the type of the visual object of the second application output on the exposed area 1121, depending on the size of the exposed area 1121. For example, the foldable electronic device 10 may output the execution screen of the second application on the exposed area 1121 when the size of the exposed area 1121 is greater than or equal to a preset value and may output an execution icon of the second application on the exposed area 1121 when the size of the exposed area 1121 is smaller than the preset value.

In various embodiments, the foldable electronic device 10 may change the power state of the exposed area 1121 to a low-power state.

In various embodiments, the foldable electronic device 10 may output, on the exposed area 1121, information of at least one recommended application (e.g., a messenger application, a weather application, or a scheduler application) together with the visual object associated with the second application by using a pre-stored application execution history.

In various embodiments, in response to the change of the foldable housing 1150 to the folded state, the foldable electronic device 10 may output the execution screen of the first application on the second display 1130 and may output the visual object associated with the second application on the exposed area 1121 of the first display 1120. The foldable electronic device 10 may output, on the exposed area 1121, a soft key for operation of the first application together with the visual object associated with the second application.

Figure 12:
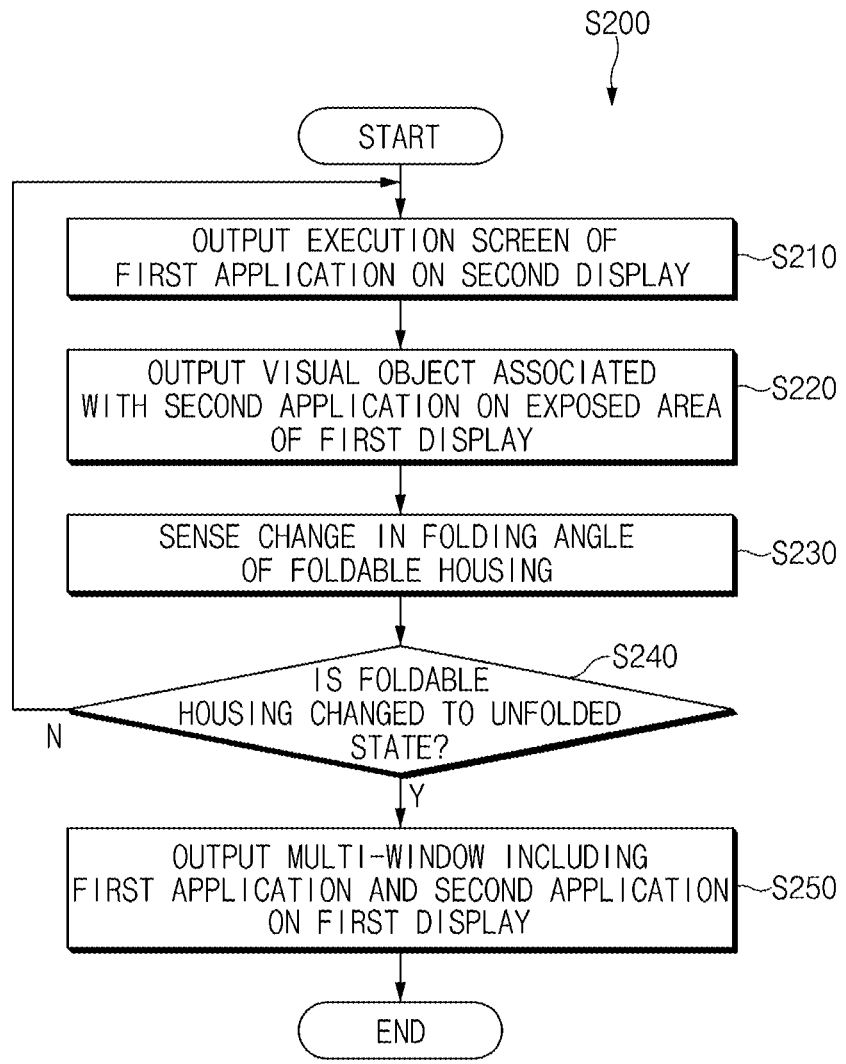
FIG. 12 is a flowchart illustrating a method for controlling a display as a foldable housing is changed from a folded state to an unfolded state according to various embodiments of the present disclosure.

FIG. 12 is a flowchart S200 illustrating a method for controlling a display as a foldable housing is changed from a folded state to an unfolded state according to various embodiments of the present disclosure.

Referring to FIG. 12, in a folded state, a foldable electronic device 10 may output an execution screen of a first application on a second display 1130 (S210) and may output a visual object associated with a second application on an exposed area 1121 of a first display 1120 (S220).

The foldable electronic device 10 may sense a folding angle of the foldable housing 1150 and a change in the folding angle (S230). The foldable electronic device 10 may determine whether the foldable housing 1150 is changed to an unfolded state, depending on the sensed folding angle of the foldable housing 1150 and the change in the folding angle (S240).

When it is determined that the foldable housing 1150 is changed to the unfolded state, the foldable electronic device 10 may output, on the first display 1120, a multi-window including a first window including the execution screen of the first application and a second window including the execution screen of the second application (S250).

In various embodiments, the foldable electronic device 10 may output, on the first display 1120, the multi-window including the first window including the execution screen of the first application and the second window including the execution screen of the second application and may set the size of the first window to the same size as the size of the execution screen of the first application that is output on the second display 1130 when the foldable housing 1150 is in the folded state.

In various embodiments, the foldable electronic device 10 may set the number of window segments included in the multi-window, depending on the number of applications running right before the change of the foldable housing 1150 to the unfolded state. For example, when three applications are being executed, the foldable electronic device 10 may output a multi-window including three windows.

Figure 13:
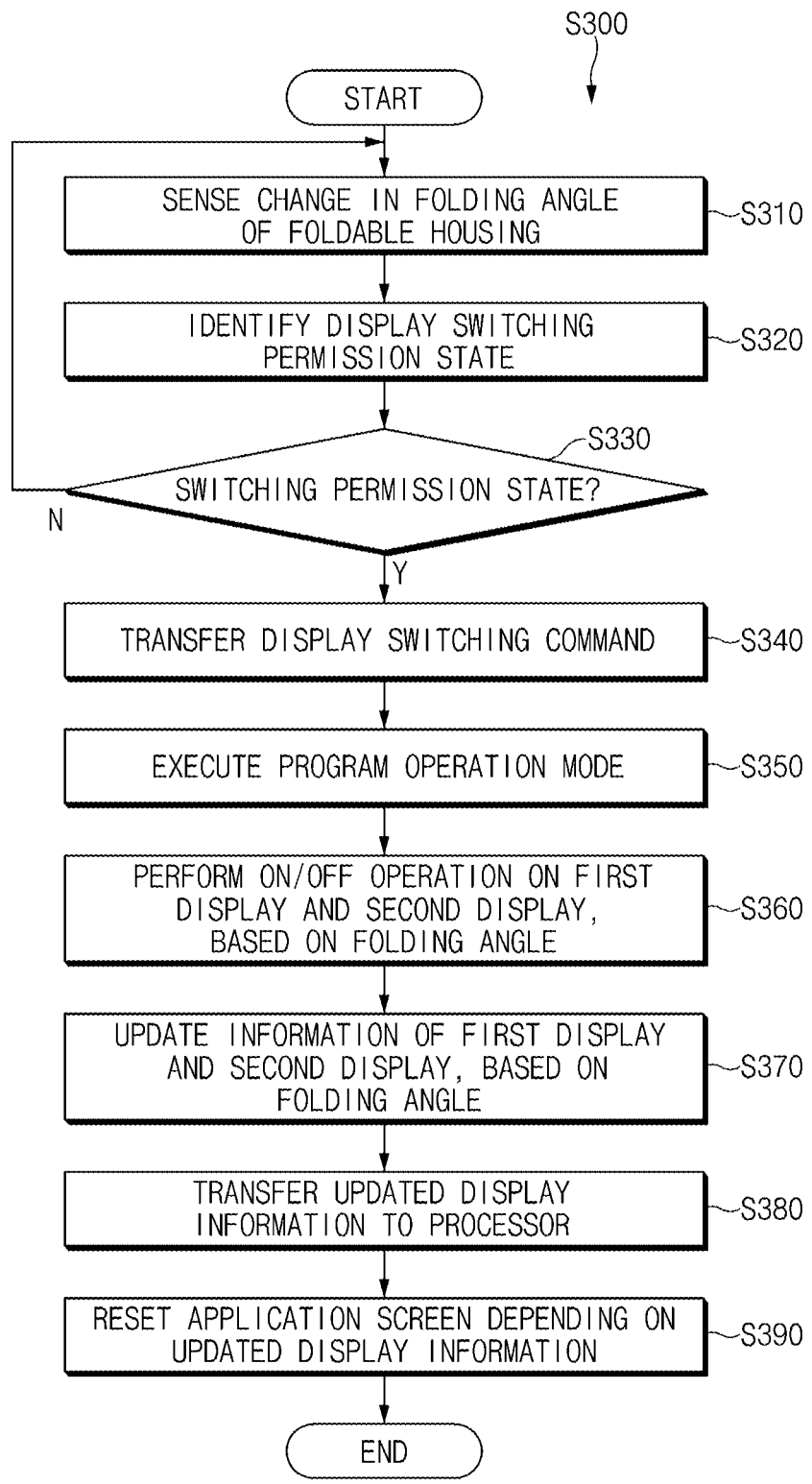
FIG. 13 is a flowchart illustrating a method for switching a display by a foldable electronic device according to various embodiments of the present disclosure.

FIG. 13 is a flowchart S300 illustrating a method for switching a display by a foldable electronic device (e.g., the foldable electronic devices 10 of FIGS. 1 to 8 or the electronic device 901 of FIG. 17) according to various embodiments.

Referring to FIG. 13, the foldable electronic device 10 may sense a change in a folding angle of a foldable housing 1150 (S310).

When switching a first display 1120 and a second display 1130 in response to a change of the foldable housing 1150 from a folded state to an unfolded state, or vice versa, the foldable electronic device 10 may identify a preset display switching permission state (S320).

The foldable electronic device 10 may determine whether the display switching permission state is allowable (S330), and when it is determined that display switching is allowable, the foldable electronic device 10 may transfer a display switching command to instruct the display switching (S340).

The foldable electronic device 10 may execute a program operation mode for the display switching (S350) and may perform an on/off operation on the first display 1120 and the second display 1130, based on the folding angle of the foldable housing 1150 sensed in step S310 (S360). For example, when the foldable housing 1150 is in a folded state, the foldable electronic device 10 may change the first display 1120 to a turned-off state and the second display 1130 to a turned-on state. In contrast, when the foldable housing 1150 is in an unfolded state, the foldable electronic device 10 may change the first display 1120 to a turned-off state and the second display 1130 to a turned-on state.

The foldable electronic device 10 may update information such as display states of the first display 1120 and the second display 1130 turned on/off depending on the folding angle of the foldable housing 1150 (S370).

The foldable electronic device 10 may transfer the display-related information updated in step S370 to a processor 1110 in the foldable electronic device 10 (S380) and may reset an execution screen of an application depending on the updated display-related information (S390).

Figure 14:
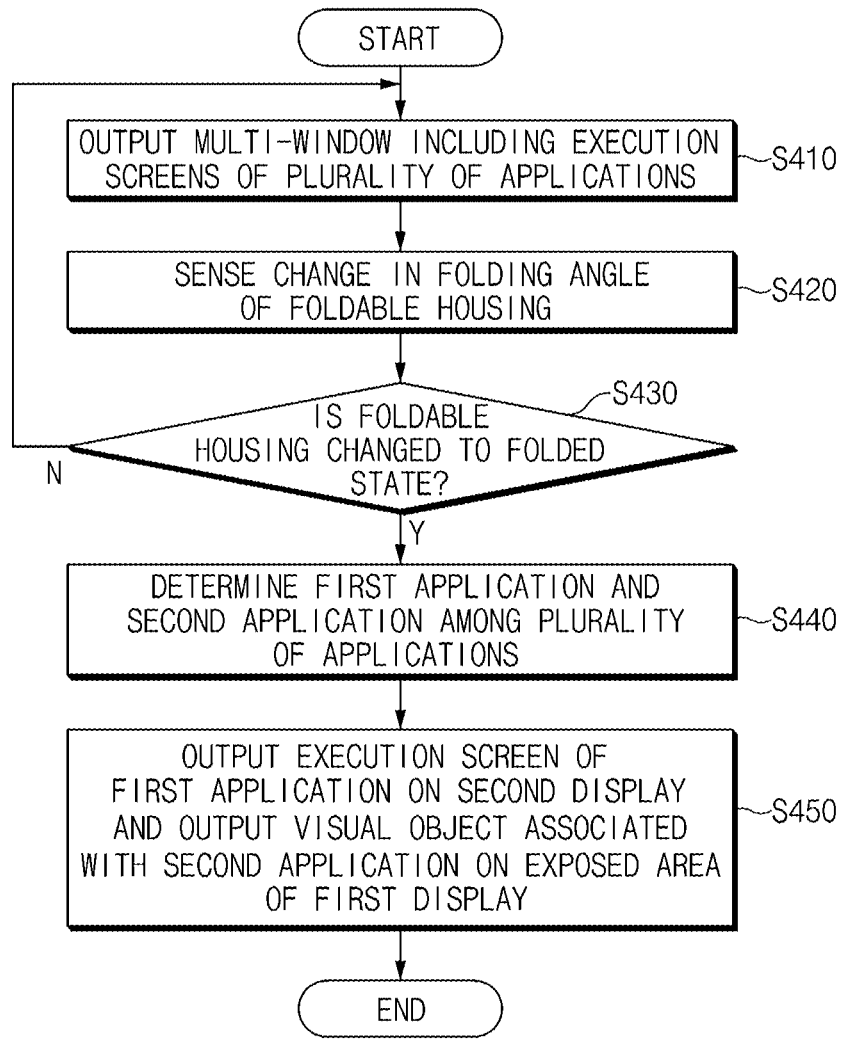
FIG. 14 is a flowchart illustrating a method for locating a plurality of applications on a multi-window depending on a change of state of a foldable housing according to various embodiments of the present disclosure.

FIG. 14 is a flowchart illustrating a method for locating a plurality of applications on a multi-window depending on a change of state of a foldable housing according to various embodiments.

Referring to FIG. 14, when the foldable housing 1150 is in a folded state, a foldable electronic device 10 may output a multi-window including execution screens of a plurality of applications on a first display 1120.

The foldable electronic device 10 may sense a folding angle of the foldable housing 1150 and a change in the folding angle (S420). The foldable electronic device 10 may determine whether the foldable housing 1150 is changed to an unfolded state, depending on the sensed folding angle of the foldable housing 1150 and the change in the folding angle (S430).

When it is determined in step S430 that the foldable housing 1150 is in a folded state, the foldable electronic device 10 may determine a first application and a second application among the plurality of applications (S440).

In various embodiments, the foldable electronic device 10 may determine an application corresponding to an execution screen output in a main area on the multi-window among the plurality of applications as the first application and may determine an application corresponding to an execution screen output in a sub-area as the second application. Here, the main area and the sub-area may be areas previously set depending on a user input in the process of configuring the multi-window.

In various embodiments, the foldable electronic device 10 may determine the first application and the second application depending on the sizes of the execution screens of the plurality of applications output on the multi-window. For example, the foldable electronic device 10 may determine an application corresponding to an execution screen output on the largest window in the multi-window as the first application.

In various embodiments, the foldable electronic device 10 may receive a user input for selecting a specific application among the plurality of applications, may determine an application corresponding to the user input as the first application, and may determine an application not corresponding to the user input as the second application.

The foldable electronic device 10 may output the execution screen of the first application determined in step S450 on a second display 1130 and may output a visual object associated with the second application on an exposed area 1121 of the first display 1120.

FIGS. 15A to 15F are views illustrating forms in which applications are displayed depending on states of foldable electronic devices (e.g., the foldable electronic devices 10 of FIGS. 1 to 8 or the electronic device 901 of FIG. 17) according to various embodiments.

Figure 15A:
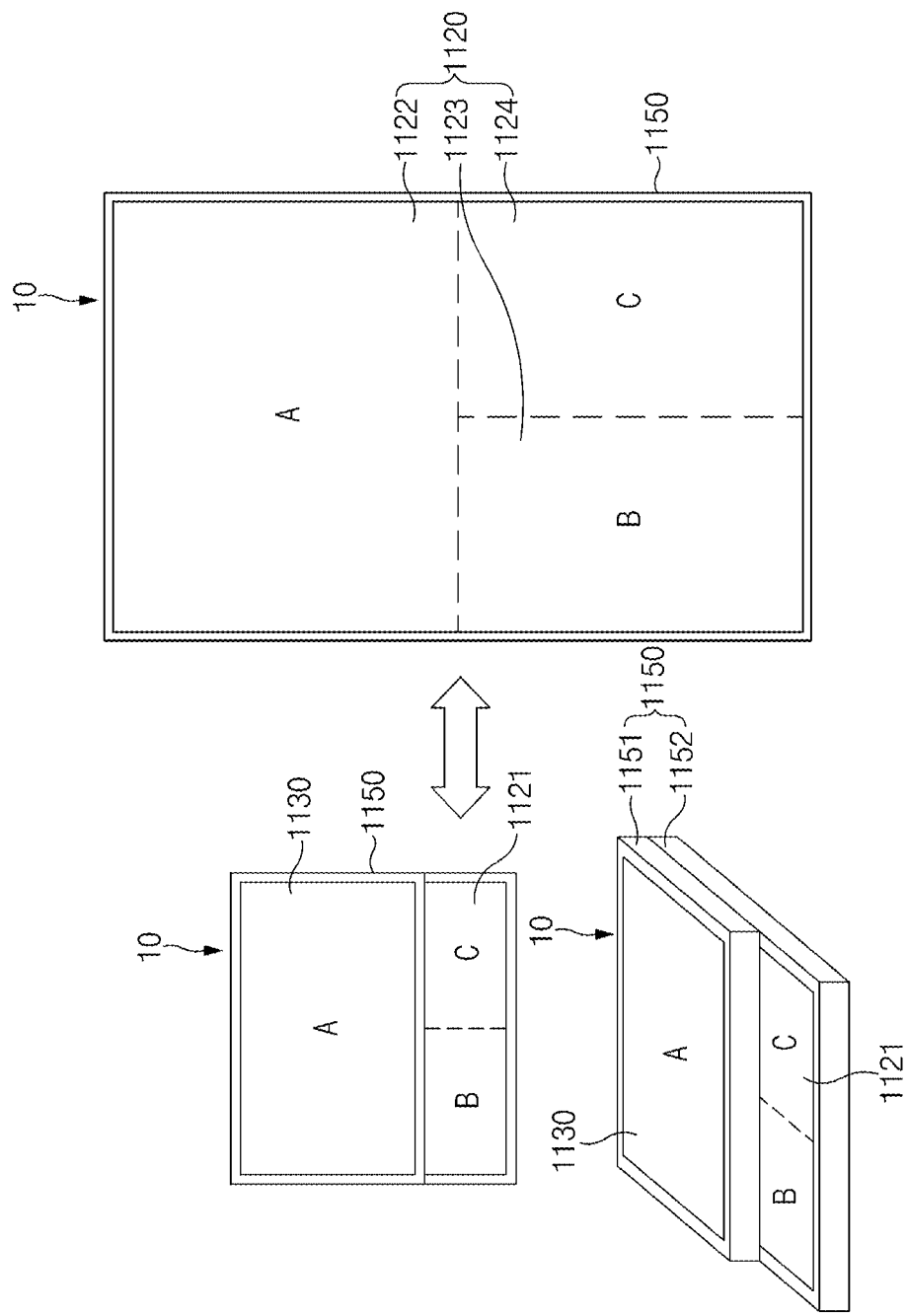
FIG. 15A is a view illustrating a form in which an application is displayed depending on a state of a foldable electronic device according to various embodiments of the present disclosure.

In various embodiments, when a foldable housing 1150 is in an asymmetrically folded state in which an exposed area 1121 of a first display 1120 is exposed toward a second display 1130 as illustrated in FIG. 15A, a foldable electronic device 10 may output an execution screen of an application A on the second display 1130 and may output visual objects associated with applications B and C on the exposed area 1121.

When the foldable housing 1150 is changed to an unfolded state, the foldable electronic device 10 may output, on the first display 1120, a multi-window including three windows that include execution screens of the application A, the application B, and the application C, respectively. For example, the foldable electronic device 10 may locate the execution screen of the application A output on the second display 1130 in a main area 1122 on the multi-window and may locate the execution screens of the application B and the application C in a first sub-area 1123 and a second sub-area 1124, respectively.

Figure 15B:
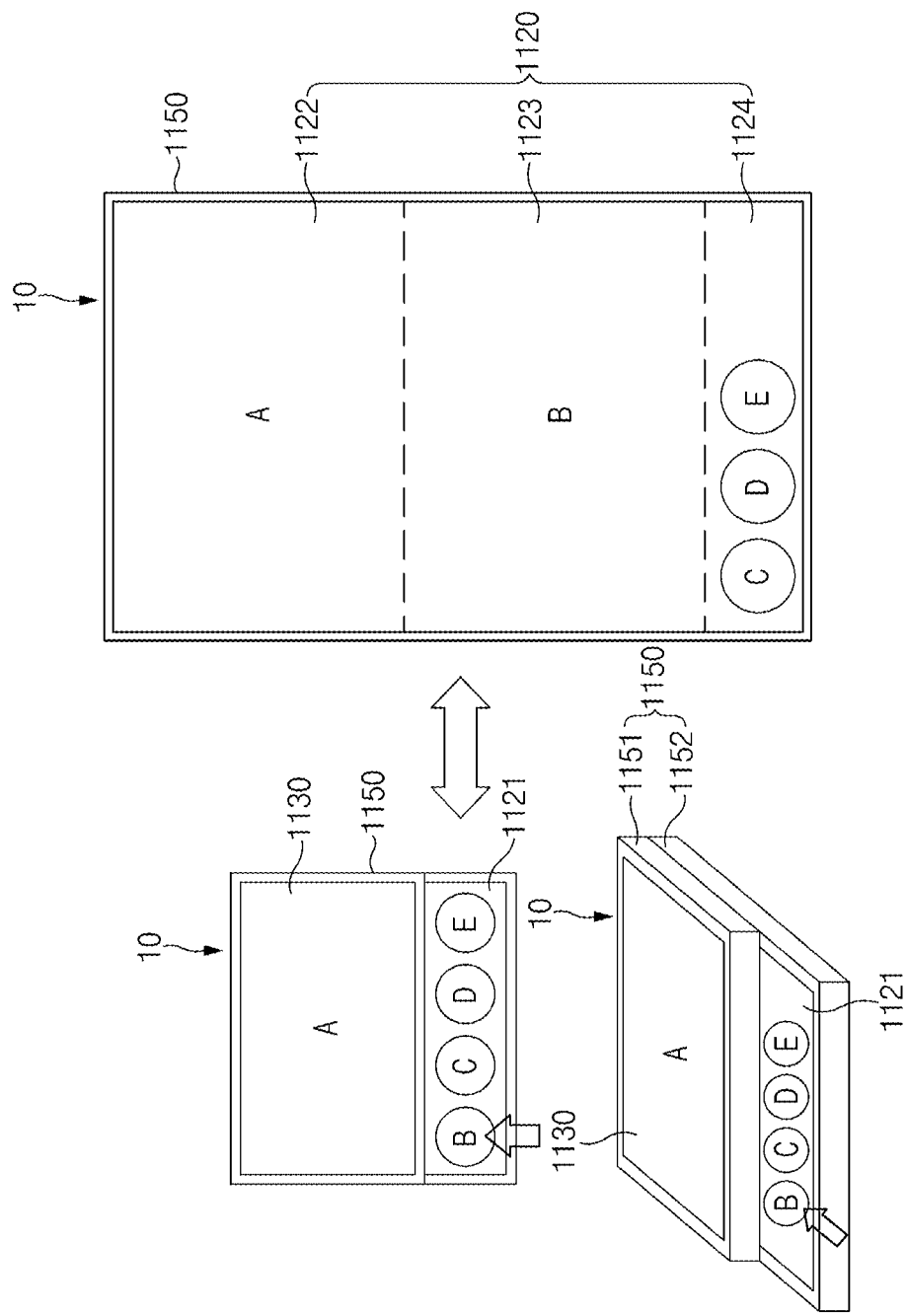
FIG. 15B is a view illustrating a form in which an application is displayed depending on a state of a foldable electronic device according to various embodiments of the present disclosure.

In various embodiments, when a foldable housing 1150 is in an asymmetrically folded state in which an exposed area 1121 of a first display 1120 is exposed toward a second display 1130 as illustrated in FIG. 15B, a foldable electronic device 10 may output an execution screen of an application A on the second display 1130 and may output visual objects associated with applications B, C, D, and E on the exposed area 1121.

Furthermore, the foldable electronic device 10 may receive a user input (e.g., a touch signal) through the exposed area 1121 of the first display 1120.

When the foldable housing 1150 is changed to an unfolded state, the foldable electronic device 10 may output, on the first display 1120, a multi-window that includes the execution screen of the application A, an execution screen of the application B corresponding to the user input, and the visual objects associated with the applications C, D, and E not corresponding to the user input. For example, the foldable electronic device 10 may locate the execution screen of the application A in a main area 1122 of the first display 1120, may locate the execution screen of the application B in a first sub-area 1123, and may locate the visual objects associated with the applications C, D, and E in a second sub-area 1124.

Figure 15C:
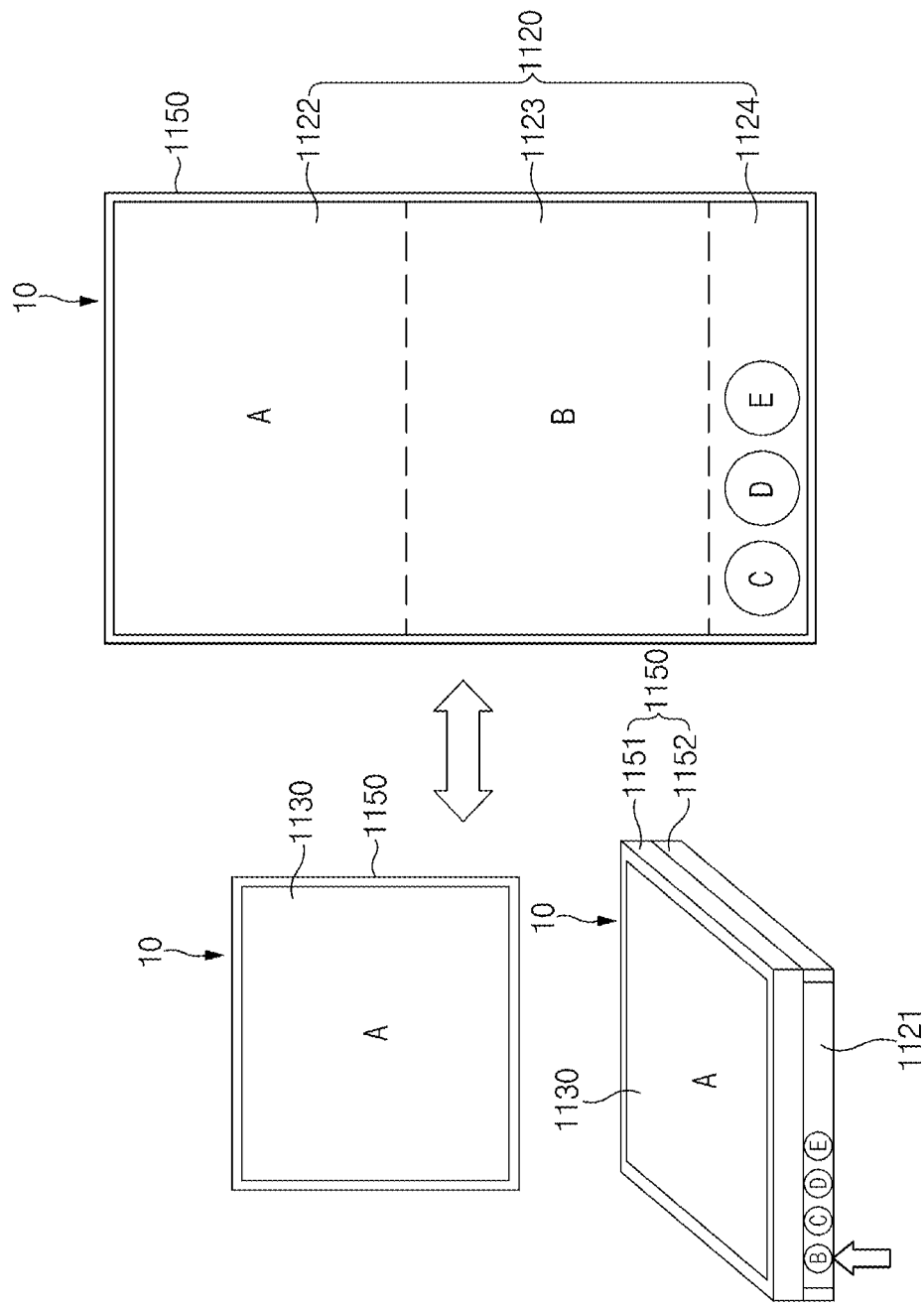
FIG. 15C is a view illustrating a form in which an application is displayed depending on a state of a foldable electronic device according to various embodiments of the present disclosure.

In various embodiments, when a foldable housing 1150 is in a symmetrically folded state in which a first display 1120 extends to a third surface of the foldable housing 1150 and an exposed area 1121 of the first display 1120 is exposed toward the third surface as illustrated in FIG. 15C, a foldable electronic device 10 may output an execution screen of an application A on a second display 1130 and may output visual objects associated with applications B, C, D, and E on the exposed area 1121 exposed toward the third surface.

Furthermore, the foldable electronic device 10 may receive a user input (e.g., a touch signal) through the exposed area 1121 of the first display 1120.

When the foldable housing 1150 is changed to an unfolded state, the foldable electronic device 10 may output, on the first display 1120, a multi-window that includes the execution screen of the application A, an execution screen of the application B corresponding to the user input, and the visual objects associated with the applications C, D, and E not corresponding to the user input.

Figure 15D:
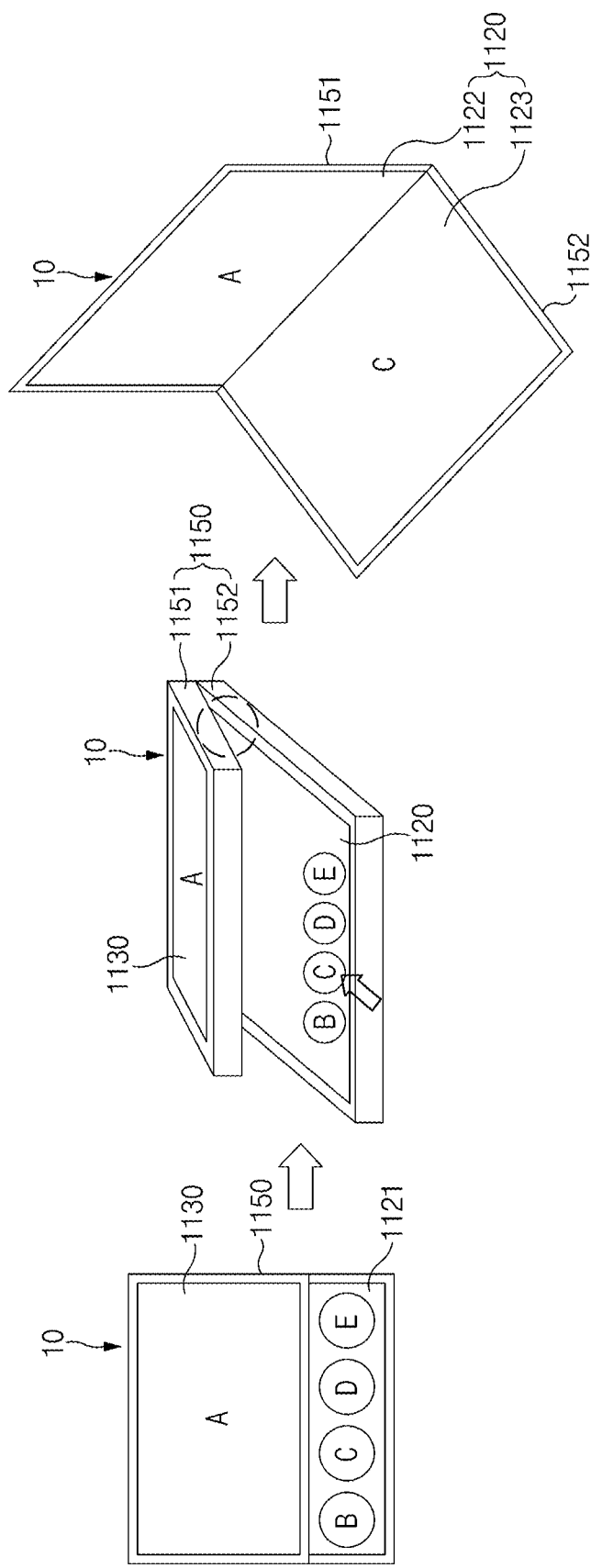
FIG. 15D is a view illustrating a form in which an application is displayed depending on a state of a foldable electronic device according to various embodiments of the present disclosure.

In various embodiments, when a foldable housing 1150 is in an asymmetrically folded state in which an exposed area 1121 of a first display 1120 is exposed toward a second display 1130 as illustrated in FIG. 15D, a foldable electronic device 10 may output an execution screen of an application A on the second display 1130 and may output visual objects associated with applications B, C, D, and E on the exposed area 1121.

Furthermore, the foldable electronic device 10 may receive a user input (e.g., a touch signal) through the exposed area 1121 of the first display 1120.

When a user input for one visual object (e.g., the application C) among the visual objects associated with the applications B, C, D, and E is received in the state in which the angle between a first housing 1151 and a second housing 1152 is maintained at a preset angle (e.g., 90 degrees), the foldable electronic device 10 may output an execution screen of a first application on a main area 1122 of the first display 1120 disposed on a first surface of the first housing 1151 and may output an execution screen of the application C corresponding to the user input on a first sub-area 1123 of the first display 1120 disposed on a first surface of the second housing 1152.

Figure 15E:
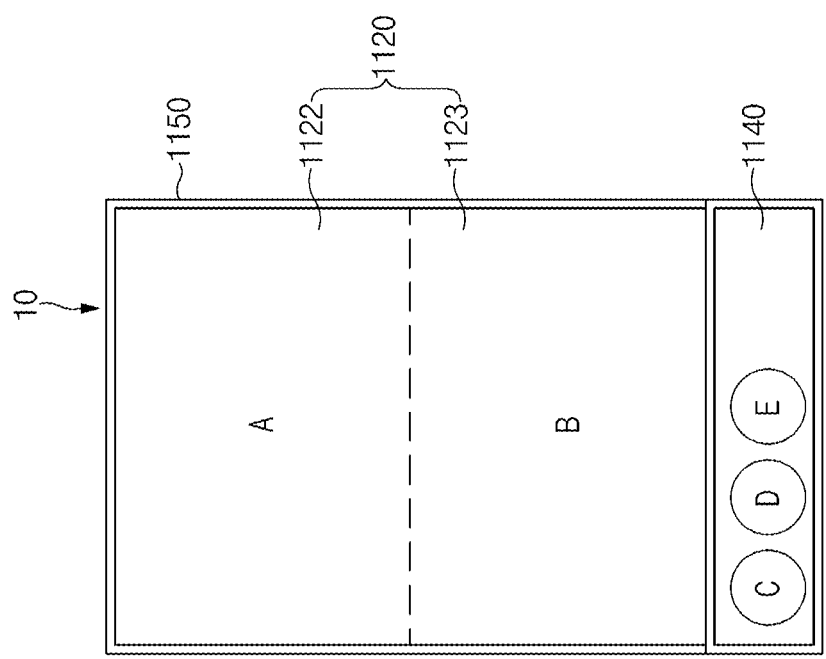
FIG. 15E is a view illustrating a form in which an application is displayed depending on a state of a foldable electronic device according to various embodiments of the present disclosure.
Figure 15E:
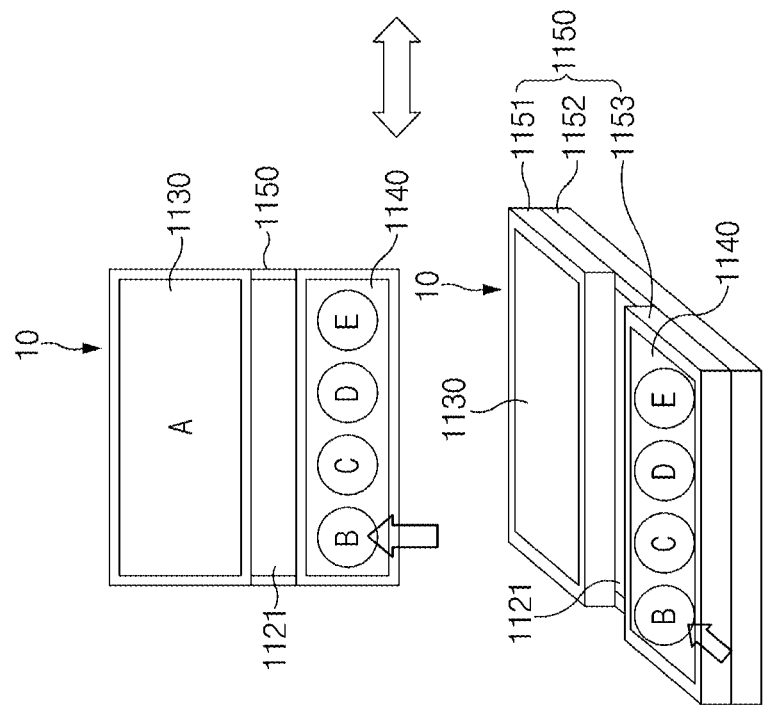

In various embodiments, when a foldable housing 1150 includes a first housing 1151, a second housing 1152 connected with at least a portion of the first housing 1151 so as to be foldable, and a third housing 1153 located on the opposite side to the first housing 1151 with respect to the second housing 1152 and at least partially connected with the second housing 1152 so as to be foldable and is folded such that a first surface of the first housing 1151 and a first surface of the third housing 1153 face a first surface of the second housing 1152 as illustrated in FIGS. 15E and 15F, a foldable electronic device 10 may output an execution screen of an application A on a second display 1130 and may output visual objects associated with applications B, C, D, and E on a third display 1140 disposed on a second surface of the third housing 1153.

Furthermore, the foldable electronic device 10 may receive a user input (e.g., a touch signal) through an exposed area 1121 of the third display 1140.

When the first housing 1151 of the foldable housing 1150 is changed to an unfolded state, the foldable electronic device 10 may output, on a first display 1120, a multi-window that includes the execution screen of the application A and an execution screen of the application B corresponding to the user input and may output, on the third display 1140, the visual objects associated with the applications C, D, and E not corresponding to the user input. At this time, the foldable electronic device 10 may locate the execution screen of the application A in a main area 1122 on the multi-window and may locate the execution screen of the application B in a sub-area 1123.

Figure 16:
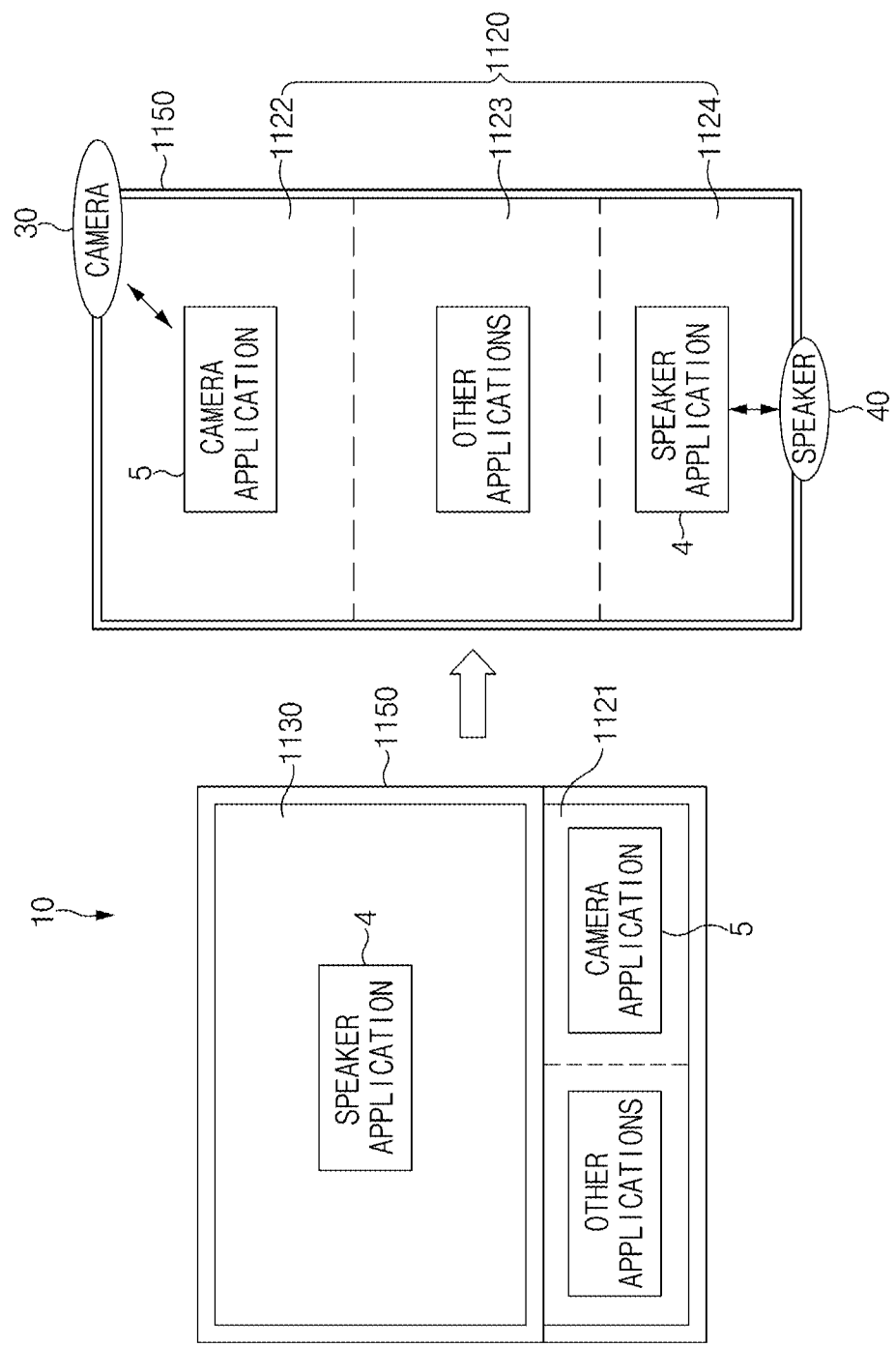
FIG. 16 is a view illustrating a form of determining an arrangement on a multi-window depending on the type of application in a foldable electronic device according to various embodiments of the present disclosure.

FIG. 16 is a view illustrating a form of determining an arrangement on a multi-window depending on the type of application in a foldable electronic device (e.g., the foldable electronic devices 10 of FIGS. 1 to 8 or the electronic device 901 of FIG. 17) according to various embodiments.

Referring to FIG. 16, when a foldable housing 1150 is changed from a folded state to an unfolded state, the foldable electronic device 10 may output a multi-window including execution screens of a first application and a second application on a first display 1120 and may determine an arrangement on the multi-window depending on the types of the first application and the second application. For example, the foldable electronic device 10 may locate a camera application 5 in a position adjacent to a camera 50 included in the foldable electronic device 10 and may locate a speaker application 4 in a position adjacent to a speaker 40 included in the foldable electronic device 10.

FIG. 17 is a block diagram of an electronic device (e.g., the foldable electronic device 10 of FIGS. 1 to 8) in a network environment according to various embodiments.

Referring to FIG. 17, the electronic device 901 in the network environment 900 may communicate with an electronic device 902 via a first network 998 (e.g., a short-range wireless communication network), or an electronic device 904 or a server 908 via a second network 999 (e.g., a long-range wireless communication network). According to an embodiment, the electronic device 901 may communicate with the electronic device 904 via the server 908. According to an embodiment, the electronic device 901 may include a processor 920, memory 930, an input device 950, a sound output device 955, a display device 960, an audio module 970, a sensor module 976, an interface 977, a haptic module 979, a camera module 980, a power management module 988, a battery 989, a communication module 990, a subscriber identification module (SIM) 996, or an antenna module 997. In some embodiments, at least one (e.g., the display device 960 or the camera module 980) of the components may be omitted from the electronic device 901, or one or more other components may be added in the electronic device 901. In some embodiments, some of the components may be implemented as single integrated circuitry. For example, the sensor module 976 (e.g., a fingerprint sensor, an iris sensor, or an illuminance sensor) may be implemented as embedded in the display device 960 (e.g., a display).

The processor 920 may execute, for example, software (e.g., a program 940) to control at least one other component (e.g., a hardware or software component) of the electronic device 901 coupled with the processor 920, and may perform various data processing or computation. According to one embodiment, as at least part of the data processing or computation, the processor 920 may load a command or data received from another component (e.g., the sensor module 976 or the communication module 990) in volatile memory 932, process the command or the data stored in the volatile memory 932, and store resulting data in non-volatile memory 934. According to an embodiment, the processor 920 may include a main processor 921 (e.g., a central processing unit (CPU) or an application processor (AP)), and an auxiliary processor 923 (e.g., a graphics processing unit (GPU), an image signal processor (ISP), a sensor hub processor, or a communication processor (CP)) that is operable independently from, or in conjunction with, the main processor 921. Additionally or alternatively, the auxiliary processor 923 may be adapted to consume less power than the main processor 921, or to be specific to a specified function. The auxiliary processor 923 may be implemented as separate from, or as part of the main processor 921.

The auxiliary processor 923 may control at least some of functions or states related to at least one component (e.g., the display device 960, the sensor module 976, or the communication module 990) among the components of the electronic device 901, instead of the main processor 921 while the main processor 921 is in an inactive (e.g., sleep) state, or together with the main processor 921 while the main processor 921 is in an active state (e.g., executing an application). According to an embodiment, the auxiliary processor 923 (e.g., an image signal processor or a communication processor) may be implemented as part of another component (e.g., the camera module 980 or the communication module 990) functionally related to the auxiliary processor 923.

The memory 930 may store various data used by at least one component (e.g., the processor 920 or the sensor module 976) of the electronic device 901. The various data may include, for example, software (e.g., the program 940) and input data or output data for a command related thereto. The memory 930 may include the volatile memory 932 or the non-volatile memory 934.

The program 940 may be stored in the memory 930 as software, and may include, for example, an operating system (OS) 942, middleware 944, or an application 946.

The input device 950 may receive a command or data to be used by other component (e.g., the processor 920) of the electronic device 901, from the outside (e.g., a user) of the electronic device 901. The input device 950 may include, for example, a microphone, a mouse, a keyboard, or a digital pen (e.g., a stylus pen).

The sound output device 955 may output sound signals to the outside of the electronic device 901. The sound output device 955 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 960 may visually provide information to the outside (e.g., a user) of the electronic device 901. The display device 960 may include, for example, a display, a hologram device, or a projector and control circuitry to control a corresponding one of the display, hologram device, and projector. According to an embodiment, the display device 960 may include touch circuitry adapted to detect a touch, or sensor circuitry (e.g., a pressure sensor) adapted to measure the intensity of force incurred by the touch.

The audio module 970 may convert a sound into an electrical signal and vice versa. According to an embodiment, the audio module 970 may obtain the sound via the input device 950, or output the sound via the sound output device 955 or a headphone of an external electronic device (e.g., an electronic device 902) directly (e.g., wiredly) or wirelessly coupled with the electronic device 901.

The sensor module 976 may detect an operational state (e.g., power or temperature) of the electronic device 901 or an environmental state (e.g., a state of a user) external to the electronic device 901, and then generate an electrical signal or data value corresponding to the detected state. According to an embodiment, the sensor module 976 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 977 may support one or more specified protocols to be used for the electronic device 901 to be coupled with the external electronic device (e.g., the electronic device 902) directly (e.g., wiredly) or wirelessly. According to an embodiment, the interface 977 may include, for example, a high definition multimedia interface (HDMI), a universal serial bus (USB) interface, a secure digital (SD) card interface, or an audio interface.

A connecting terminal 978 may include a connector via which the electronic device 901 may be physically connected with the external electronic device (e.g., the electronic device 902). According to an embodiment, the connecting terminal 978 may include, for example, a HDMI connector, a USB connector, a SD card connector, or an audio connector (e.g., a headphone connector).

The haptic module 979 may convert an electrical signal into a mechanical stimulus (e.g., a vibration or a movement) or electrical stimulus which may be recognized by a user via his tactile sensation or kinesthetic sensation. According to an embodiment, the haptic module 979 may include, for example, a motor, a piezoelectric element, or an electric stimulator.

The camera module 980 may capture a still image or moving images. According to an embodiment, the camera module 980 may include one or more lenses, image sensors, image signal processors, or flashes.

The power management module 988 may manage power supplied to the electronic device 901. According to one embodiment, the power management module 988 may be implemented as at least part of, for example, a power management integrated circuit (PMIC).

The battery 989 may supply power to at least one component of the electronic device 901. According to an embodiment, the battery 989 may include, for example, a primary cell which is not rechargeable, a secondary cell which is rechargeable, or a fuel cell.

The communication module 990 may support establishing a direct (e.g., wired) communication channel or a wireless communication channel between the electronic device 901 and the external electronic device (e.g., the electronic device 902, the electronic device 904, or the server 908) and performing communication via the established communication channel. The communication module 990 may include one or more communication processors that are operable independently from the processor 920 (e.g., the application processor (AP)) and supports a direct (e.g., wired) communication or a wireless communication. According to an embodiment, the communication module 990 may include a wireless communication module 992 (e.g., a cellular communication module, a short-range wireless communication module, or a global navigation satellite system (GNSS) communication module) or a wired communication module 994 (e.g., a local area network (LAN) communication module or a power line communication (PLC) module). A corresponding one of these communication modules may communicate with the external electronic device via the first network 998 (e.g., a short-range communication network, such as Bluetooth™, wireless-fidelity (Wi-Fi) direct, or infrared data association (IrDA)) or the second network 999 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 992 may identify and authenticate the electronic device 901 in a communication network, such as the first network 998 or the second network 999, using subscriber information (e.g., international mobile subscriber identity (IMSI)) stored in the subscriber identification module 996.

The antenna module 997 may transmit or receive a signal or power to or from the outside (e.g., the external electronic device) of the electronic device 901. According to an embodiment, the antenna module 997 may include an antenna including a radiating element composed of a conductive material or a conductive pattern formed in or on a substrate (e.g., PCB). According to an embodiment, the antenna module 997 may include a plurality of antennas. In such a case, at least one antenna appropriate for a communication scheme used in the communication network, such as the first network 998 or the second network 999, may be selected, for example, by the communication module 990 (e.g., the wireless communication module 992) from the plurality of antennas. The signal or the power may then be transmitted or received between the communication module 990 and the external electronic device via the selected at least one antenna. According to an embodiment, another component (e.g., a radio frequency integrated circuit (RFIC)) other than the radiating element may be additionally formed as part of the antenna module 997.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 901 and the external electronic device 904 via the server 908 coupled with the second network 999. Each of the electronic devices 902 and 904 may be a device of a same type as, or a different type, from the electronic device 901. According to an embodiment, all or some of operations to be executed at the electronic device 901 may be executed at one or more of the external electronic devices 902, 904, or 908. For example, if the electronic device 901 should perform a function or a service automatically, or in response to a request from a user or another device, the electronic device 901, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 901. The electronic device 901 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 940) including one or more instructions that are stored in a storage medium (e.g., internal memory 936 or external memory 938) that is readable by a machine (e.g., the electronic device 901). For example, a processor(e.g., the processor 920) of the machine (e.g., the electronic device 901) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Although the present disclosure has been described with various embodiments, various changes and modifications may be suggested to one skilled in the art. It is intended that the present disclosure encompass such changes and modifications as fall within the scope of the appended claims.

What is claimed is:

1. A foldable electronic device comprising:
   a foldable housing including a first housing and a second housing;
   a first display disposed on a first surface of the foldable housing and foldable depending on a folding motion of the first housing and the second housing;
   a second display disposed on a second surface of the first housing, the second surface configured to face away from the first surface;
   a sensor configured to sense a folding angle of the foldable housing; and
   a processor operationally connected with the first display, the second display, and the sensor,
   wherein the first display includes an exposed area that is exposed to an outside in a folded state of the foldable housing, and
   wherein the processor is configured to:
      output, on the first display, a multi-window including a first window displaying an execution screen of a first application and a second window displaying an execution screen of a second application when the foldable housing is in an unfolded state;
      output the execution screen of the first application on the second display in response to a change of the foldable housing from the unfolded state to the folded state; and
      output a visual object associated with the second application on the exposed area of the first display.

2. The foldable electronic device of claim 1, wherein the sensor includes at least one of a Hall sensor, an angle sensor, a distance sensor, and a gyroscope sensor.

3. The foldable electronic device of claim 1, wherein the processor is further configured to:
   determine the exposed area using the folding angle sensed by the sensor, and
   control the first display such that the visual object is output on the determined exposed area.

4. The foldable electronic device of claim 1, wherein the first display is disposed on the first surface of the foldable housing and a third surface including at least one of side surfaces of the foldable housing.

5. The foldable electronic device of claim 4, wherein in the folded state of the foldable housing, the exposed area includes at least one of an area of the first display exposed toward the first surface and an area of the first display disposed on the third surface.

6. The foldable electronic device of claim 1, wherein the processor is further configured to change the exposed area to a low-power state.

7. The foldable electronic device of claim 1, wherein the processor is further configured to:
calculate a size of the exposed area using the folding angle sensed by the sensor, and set a number of visual objects related to the second application that is output on the exposed area depending on the calculated size of the exposed area.

8. The foldable electronic device of claim 1, wherein the processor is further configured to:
calculate a size of the exposed area using the folding angle sensed by the sensor;
output the execution screen of the second application on the exposed area when the size of the exposed area is greater than or equal to a preset value; and
output an execution icon of the second application on the exposed area when the size of the exposed area is smaller than the preset value.

9. The foldable electronic device of claim 1, wherein the processor is further configured to output, on the exposed area, information of at least one recommended application together with the visual object associated with the second application by using a pre-stored application execution history when it is determined that the foldable housing is in the folded state.

10. The foldable electronic device of claim 1, wherein the processor is further configured to output, on the exposed area, a soft key for operation of the first application in response to the change of the foldable housing to the folded state.

11. The foldable electronic device of claim 1, wherein in response to the change of the foldable housing to the folded state, the processor is further configured to control the first display and the second display such that a switching screen is output for a preset period of time.

12. The foldable electronic device of claim 1, wherein the processor is further configured to:
when the foldable housing is in the folded state:
output the execution screen of the first application on the second display, and
output the visual object on the exposed area; and
in response to a change of the foldable housing from the folded state to the unfolded state, output, on the first display, the multi-window including the first window including the execution screen of the first application and the second window including the execution screen of the second application.

13. The foldable electronic device of claim 12, wherein the processor is further configured to set a size of the first window to a same size as a size of the execution screen of the first application that is output on the second display when the foldable housing is in the folded state.

14. The foldable electronic device of claim 12, wherein the processor is further configured to:

receive a user input to select an application through the exposed area in the folded state of the foldable housing;
locate the execution screen of the first application in a main area on the multi-window when the foldable housing is changed to the unfolded state; and
locate an execution screen of the application corresponding to the user input in a sub-area on the multi-window.

15. A foldable electronic device comprising:
a foldable housing including:
a first housing,
a second housing connected with at least a portion of the first housing so as to be foldable, and
a third housing located on an opposite side to the first housing with respect to the second housing and at least partially connected with the second housing so as to be foldable;
a first display disposed on a first surface of the foldable housing and foldable depending on a folding motion of the first housing, the second housing, and the third housing;
a second display disposed on at least a portion of the first housing included in a second surface configured to face away from the first surface;
a third display disposed on at least a portion of the third housing included in the second surface;
a sensor configured to sense a folding angle of the foldable housing; and
a processor operationally connected with the first display, the second display, the third display, and the sensor,
wherein the processor is configured to:
output, on the first display, a multi-window including a first window including an execution screen of a first application and a second window including an execution screen of a second application when the foldable housing is in an unfolded state;
output the execution screen of the first application on the second display in response to a change of the foldable housing from the unfolded state to a folded state; and
output a visual object associated with the second application on the third display.

16. The foldable electronic device of claim 15, wherein the sensor includes at least one of a Hall sensor, an angle sensor, a distance sensor, and a gyroscope sensor.

17. The foldable electronic device of claim 15, wherein the first display includes an exposed area that is exposed to an outside in a folded state of the foldable housing.

18. The foldable electronic device of claim 17, wherein the processor is further configured to change the exposed area to a low-power state.

19. The foldable electronic device of claim 17, wherein the processor is further configured to output, on the exposed area, a soft key for operation of the first application in response to the change of the foldable housing to the folded state.

20. The foldable electronic device of claim 15, wherein in response to the change of the foldable housing to the folded state, the processor is further configured to control the first display and the second display such that a switching screen is output for a preset period of time.

* * * * *